(12) United States Patent
Blokzijl et al.

(10) Patent No.: US 7,153,821 B2
(45) Date of Patent: *Dec. 26, 2006

(54) USE OF GRAFT POLYMERS IN FABRIC CLEANING

(75) Inventors: Wilfried Blokzijl, Merseyside (GB); Christopher Clarkson Jones, Merseyside (GB); Susanne Henning Rogers, Merseyside (GB); Brodyck James Lachlan Royles, Merseyside (GB); Michael Stephen White, Merseyside (GB)

(73) Assignee: Unilever Home & Personal Care USA Division of Conopco, Inc, Greewich, CT (US)

( * ) Notice: Subject to any disclaimer, the term of this patent is extended or adjusted under 35 U.S.C. 154(b) by 407 days.

This patent is subject to a terminal disclaimer.

(21) Appl. No.: 10/484,392

(22) PCT Filed: Jul. 10, 2002

(86) PCT No.: PCT/EP02/07682

§ 371 (c)(1),
(2), (4) Date: Jan. 20, 2004

(87) PCT Pub. No.: WO03/010267

PCT Pub. Date: Feb. 6, 2003

(65) Prior Publication Data

US 2004/0171513 A1  Sep. 2, 2004

(30) Foreign Application Priority Data

Jul. 20, 2001 (GB) .............................. 0117768.2

(51) Int. Cl.
*C11D 3/22* (2006.01)
*C11D 3/37* (2006.01)
*B08B 3/04* (2006.01)
*C08F 251/00* (2006.01)

(52) U.S. Cl. .................. 510/475; 510/276; 510/470; 510/473; 8/137

(58) Field of Classification Search ............ 510/276, 510/470, 473, 475; 8/137
See application file for complete search history.

(56) References Cited

U.S. PATENT DOCUMENTS

| | | | |
|---|---|---|---|
| 3,386,932 A | 6/1968 | Steinmann | 260/16 |
| 4,206,108 A | 6/1980 | Simms | 260/31.2 |
| 4,235,735 A | 11/1980 | Marco et al. | 252/174.18 |
| 4,758,645 A | 7/1988 | Miyazono et al. | 527/311 |
| 4,891,404 A | 1/1990 | Narayan et al. | 525/54.2 |
| 5,223,171 A | 6/1993 | Jost et al. | 252/174.17 |
| 5,227,446 A | 7/1993 | Denzinger et al. | 527/314 |
| 5,580,941 A | 12/1996 | Krause et al. | 527/300 |
| 5,760,154 A | 6/1998 | Krause et al. | 527/311 |
| 6,358,903 B1 | 3/2002 | Hopkinson et al. | 510/375 |
| 6,455,489 B1 | 9/2002 | Bijsterbosch et al. | 510/474 |
| 6,517,588 B1 | 2/2003 | Hopkinson | 8/137 |
| 6,562,771 B1 | 5/2003 | Finch et al. | 510/101 |
| 6,602,847 B1 | 8/2003 | Emery et al. | 510/446 |

FOREIGN PATENT DOCUMENTS

| | | |
|---|---|---|
| DE | 195 18 620 | 11/1996 |
| EP | 936 224 | 8/1999 |
| FR | 2 761 366 | 10/1998 |
| GB | 2 322 137 | 8/1998 |
| WO | 91/16359 | 10/1991 |
| WO | 95/33813 | 12/1995 |
| WO | 98/29528 | 7/1998 |
| WO | 99/14245 | 3/1999 |
| WO | 99/14295 | 3/1999 |
| WO | 00/18860 | 4/2000 |
| WO | 00/18861 | 4/2000 |
| WO | 00/18862 | 6/2000 |
| WO | 00/40684 | 7/2000 |
| WO | 00/40685 | 7/2000 |
| WO | 01/88075 | 11/2001 |

OTHER PUBLICATIONS

PCT International Search Report in a PCT application PCT/EP 03/14522.

A. Hebeish, J.T. Guthrie, "*The Chemistry and Technology of Cellulosic Copolymers*," Springer-Verlag Berlin Heidelberg New York 1981.

Samal et al., J. Macromol. Chem. Phys., 1986, "*Graft Copolymerization of Cellulose, Cellulose Derivative, and Lignocellulose*", pp. 81-85.

A. Waly et al., Polymers & Polymer Composites, vol. 4, No. 1, 1996, "*Cellulose Thiocarbonate-Potassium Bromate Redox System-Initiated Graft Copolymerisation of Acrylic Esters on to Cotton Fabric.*" pp. 53-60.

Oliverira et al., Polymer vol. 35, No. 9, 1994, "*Multiphase materials with lignin: 13, Block copolymers with cellulose propionate*", pp. 1977-2014.

C. Feger et al., Polymer Bulletin © by Springer-Verlag 1980, 3, 407-413 (1980), "*Cellulose Containing Block Copolymers 1, Synthesis of Trimethylcellulose-(b-Poly(Oxytetramethylene))—Star Block Copolymers*".

C. Feger et al., Polymer Bulletin © by Springer-Verlag 1982, 6, 321-326 (1982) "*Cellulose Containing Block Copolymers 2. Molecular Weights and Solution Properties of Trimethylcellulose—Poly (oxytetramethylene) Block Copolymers*".

(Continued)

*Primary Examiner*—Brian P Mruk
(74) *Attorney, Agent, or Firm*—Rimma Mitelman

(57) ABSTRACT

A laundry cleaning composition comprises a graft polysaccharide polymer benefit agent capable of imparting a benefit such as soil release or fabric care, and at least one additional laundry cleaning ingredient.

28 Claims, No Drawings

OTHER PUBLICATIONS

Steinmann, "*Elastomeric Fibers From Cellulose Triacetate*", pp. 285-290.

Kim et al., *J. Macromol., SCL—Chem.*, A10(4), pp. 671-679 (1976), "*Biodegradable Cellulose Block Copolymers*".

Mezger et al., *Die Angewandte Makromolekulare Chemie* 116 (1983) 13-27 (Nr. 1811), "*Cellulose Containing Block Copolymers 4, Cellulose Triester Macroinitiators*".

PCT International Search Report in a PCT application PCT/EP 02/07682.

GB Search Report in a GB application GB 0117768.2.

Co-pending U.S. Appl. No. 10/239,967, filed Sep. 26, 2002, Hopkinson et al, Case No.: C4018(C).

Co-pending U.S. Appl. No. 10/013,964, filed Dec. 11, 2001, Findlay et al, Case No.: C4079(C).

Co-pending U.S. Appl. No. 10/210,153, filed Aug. 1, 2002, Ferguson et al, Case No.: C4134(C).

Co-pending U.S. Appl. No. 10/225,863, filed Aug. 22, 2002, Findlay et al, Case No.: C4148(C).

Co-pending U.S. Appl. No. 10/225,864, filed Aug. 22, 2002, Hunter et al, Case No.: C4158(C).

Co-pending U.S. Appl. No. 10/484,291, filed Jan. 20, 2004, Charmot et al, Case No.: C4129(C).

Co-pending U.S. Appl. No. 10/484,295, filed Jan. 20, 2004, Rogers et al, Case No.: C4132(C).

Zhang et al., "*Graft Copolymerization of Cellulose with Structopendant Unsaturated Ester Moieties in Homogeneous Solution*", Journal of Applied Polymer Science, vol. 66, 307-317, 1997.

V. Bojanic et al., "*Synthesis and Electrochemistry of Grafted Copolymers of Cellulose with 4-Vinylpyridine, 1-Vinylimidazole, 1-Vinyl-2-pyrrolidinone, and 9-Vinylcarbazole*", Journal of Applied Polymer Science, vol. 60, 1719-1725 (1996).

Derwent Abstract of DE 195 18 620—published: Nov. 28, 1996.

USE OF GRAFT POLYMERS IN FABRIC CLEANING

TECHNICAL FIELD

The present invention relates to graft polysaccharide polymers which may be incorporated in laundry cleaning treatments as benefit agemts. The graft polymers have been found, dependent upon the structure of the compound in question, to deliver a soil release, fabric care and/or other laundry cleaning benefits.

BACKGROUND AND PRIOR ART

The deposition of a benefit agent onto a substrate, such as a fabric, is well known in the art. In laundry applications typical "benefit agents" include fabric softeners and conditioners, soil release polymers, sunscreens; and the like. Deposition of a benefit agent is used, for example, in fabric treatment processes such as fabric softening to impart desirable properties to the fabric substrate.

Conventionally, the deposition of the benefit agent has had to rely upon the attractive forces between the oppositely charged substrate and the benefit agent. Typically this requires the addition of benefit agents during the rinsing step of a treatment process so as to avoid adverse effects from other charged chemical species present in the treatment compositions. For example, cationic fabric conditioners are incompatible with anionic surfactants in laundry washing compositions.

Such adverse charge considerations can place severe limitations upon the inclusion of benefit agents in compositions where an active component thereof is of an opposite charge to that of the benefit agent. For example, cotton is negatively charged and thus requires a positively charged benefit agent in order for the benefit agent to be substantive to the cotton, ie to have an affinity for the cotton so as to absorb onto it. Often the substantivity of the benefit agent is reduced and/or the deposition rate of the material is reduced because of the presence of incompatible charged species in the compositions. However, in recent times, it has been proposed to deliver a benefit agent in a form whereby it is substituted onto another chemical moiety which increases its affinity for the substrate in question.

The compounds used by the present invention for soil-release and/or other benefits are substituted polysaccharide structures, especially substituted cellulosic structures.

Recently, substituted cellulosic oligomers and polymers have been proposed as ingredients in laundry products for providing a variety of different benefits such as fabric rebuild, as disclosed in WO-A-98/29528, WO-A-99/14245, WO-A-00/18861, WO-A-/18862, WO-A-00/40684 and WO-A-00/40685.

U.S. Pat. No. 4,235,735 discloses cellulose acetates with a defined degree of substitution as anti-redeposition agents in laundry products.

Cellulosic esters are also known for use in non-laundry applications, as described in WO-A-91/16359 and GB-A-1 041 020.

The grafting of synthetic polymers onto a cellulosic backbone has been the subject of research activities for a long time with the object of producing a polymer that has the beneficial properties of both cellulose and the synthetic polymers. Enormous research and development efforts have occurred over the last 40 years, but no polymer or process has yet been discovered which has proceeded to commercialisation.

The grafting of polymers on a cellulosic backbone proceeds through radical polymerisation wherein an ethylenic monomer is contacted with a soluble or insoluble cellulosic material together with a free radical initiator. The radical thus formed reacts on the cellulosic backbone (usually by proton abstraction), creates radicals on the cellulosic chain, which subsequently react with monomers to form graft chains on the cellulosic backbone. Related techniques use other sources of radical such as high energy irradiation or oxidising agents such as cerium salt or redox systems such as thiocarbonate-potassium bromate. These methods are well known, see, eg, McDonald, et al. Prog. Polym. Sci. 1984, 10, 1; Hebeish et al, "The Chemistry and Technology of cellulosic copolymers", (Springer Verlag, 1981); Samal et al. J Macromol. Sci-Rev.Macromol. Chem. 1986, 26, 81; Waly et al, Polymers & polymer composites 4,1,53,1996; and D. Klenn et al, Comprehensive Cellulose Chemistry, vol. 2 "Functionalization of Cellulose" pp. 17–31 (Wiley-VCH, Weinheim, 1998).

Another strategy involves functionalising the cellulose backbone with a reactive double bond and polymerising in the presence of monomers under conventional free radical polymerisation conditions, see, eg, U.S. Pat. No. 4,758,645 (Nippon Paint). Alternatively, a free radical initiator is covalently linked to the polysaccharide backbone to generate a radical from the backbone to initiate polymerisation and form graft copolymers (see, eg, Bojanic V, J, Appl.Polym. Sci., 60, 1719–1725, 1996 and Zheng et al, ibid, 66, 307–317, 1997). For example, in U.S. Pat. No. 4,206,108 (Du Pont), a thiol is covalently bound to a polymeric backbone with pendent hydroxy groups via a urethane linkage; this polymer containing mercapto group is then reacted with ethylenically unsaturated monomers to form the graft copolymer.

Unfortunately, none of these techniques lead to a well-defined material with a controlled macrostructure, and microstructure. For instance, none of these techniques leads to a good control of both the number of graft chains per cellulose backbone molecule and molecular weight of the graft chains. Moreover, side reactions are difficult, if not impossible, to avoid, including the formation of un-grafted polymer, graft chain degradation and/or crosslinking of the grafted chains.

In an attempt to solve these problems, pre-formed chains have been chemically grafted onto cellulosic polymers. For instance, in U.S. Pat. No. 4,891,404, polystyrene chains were grown in an anionic polymerisation and capped with, eg, $CO_2$. These grafts were then attached to mesylated or tosylated cellulose triacetate by nucleophilic displacement. This method is difficult to commercialise because of the stringent conditions required by the method. Moreover, the set of monomers that can be used in this method is restricted to non-polar olefins, thus precluding any application in water media.

Block copolymers based on cellulose esters have been reported. See, eg, Oliveira et al, Polymer, 35, 9, 1994; Feger et al, Polymer Bulletin, 3,407, 1980; Feger et al,Ibid, 6, 321, 1982; U.S. Pat. No. 3,386,932; Steinmann, Polym. Preprint, Am. Chem.Soc. Div. Polym. Chem. 1970, 11, 285; Kim et al, J.Polym. Sci. Polym, Lett. Ed., 1973, 11, 731; and Kim et al. J Macromol. Sci., Chem (A) 1976, 10, 671. A major problem with these references is the generation of considerable chain branching, grafting or crosslinking.

Mezger et al, Angew. Makromol Chem., 116,13,1983 prepared oligomeric, monohydroxy-terminated cellulose coupled with 4, -4'-diphenyldisocyanate, which was then used as a UV-macro-photo-initiator to prepare triblock copolymers. This reaction is known as the iniferter technique and uses UV initiation, which limits its applicability to certain processing methods. Furthermore, it is typically applicable to styrenic and methacrylic monomers. Other monomers, such as acrylics, vinyl acetate, acrylamide type monomers, which are in widespread use in waterborne systems, might require another technique.

So-called "living" radical polymerisation techniques are known which can give better defined polymers in terms of molecular structure. Three approaches to preparation of controlled polymers in a "living" radical process have been described (Greszta et al, Macromolecules, 27, 638 (1994)). The first approach involves the situation where growing radicals react reversibly with scavenging radicals to form covalent species. The second approach involves the situation where growing radicals react reversibly with covalent species to produce persistent radicals. The third approach involves the situation where growing radicals participate in a degenerative transfer reaction which regenerates the same type of radicals. However, none of these techniques have been successfully applied to polysaccharide substrates.

As mentioned above, it has previously been recognised in the art that cellulose based materials adhere to cotton fibres. For example, WO 00/18861A and WO 00/18862A (Unilever) disclose cellulosic compounds having a benefit agent attached, so that the benefit agent will be attached to the fibre. See also WO 99/14925 (Procter & Gamble). However, the ability of polysaccharide, especially cellulose, based materials to adhere has not been fully investigated, and a need exists to find polysaccharide based materials that are of commercial significance.

DEFINITION OF THE INVENTION

A first aspect of the present invention provides a laundry cleaning composition comprising a graft polymer benefit agent and at least one additional laundry cleaning ingredient, the graft polymer benefit agent having the general formula

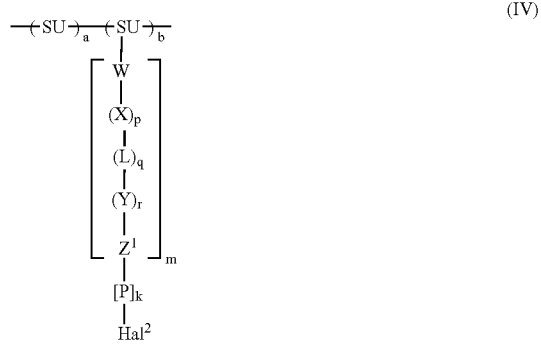

(IV)

in which each SU represents a sugar unit in a polysaccharide backbone;

a represents the number of unsubstituted sugar units as a percentage of the total number of sugar units and is in the range from 0 to 99.9%, preferably 65 to 99%, more preferably 80 to 99%;

b represents the number of substituted sugar units as a percentage of the total number of sugar units and is in the range from 0.1 to 100%, preferably 1 to 35%, more preferably 1 to 20%;

m represents the degree of substitution per sugar unit and is from 1 to 3;

W represents a group —O— or —NR$^1$—, where R$^1$ represents a hydrogen atom or an optionally substituted alkyl group, preferably a hydrogen atom;

p, q and r are each independently 0 or 1;

L represents an optionally substituted alkylene, cycloalkylene, arylene or heteroarylene group;

X and Y each independently represent a group —CH$_2$—, —CO—, —O—CO—, —CO—O—, —NH—CO—, —CO—NH—, —CH(OH)—CH$_2$—, —CH$_2$—CH(OH)—, —CH$_2$—O—CO—, —CO—O—CH$_2$—, —CH$_2$—CO—O—, —O—CO—CH$_2$—, —O—CO—NH—, —NH—CO—O—, —(CR$^2$R$^3$)$_s$—CO—, —CO—(CR$^2$R$^3$)$_s$—, —(CR$^2$R$^3$)$_t$—O—, —O—(CR$^2$R$^3$)$_t$—, —(CR$^2$R$^3$)$_u$—SO—, —SO—(CR$^2$R$^3$)$_u$13 , —(CR$^2$R$^3$)$_v$—SO$_2$—, —SO$_2$—(CR$^2$R$^3$)$_v$— or —NH—CO—NH, where s, t, u and v are each independently 0, 1, 2 or 3 and R$^2$ and R$^3$ each independently represent a hydrogen atom or an optionally substituted alkyl group, preferably a hydrogen atom;

Z$^1$ represents a group

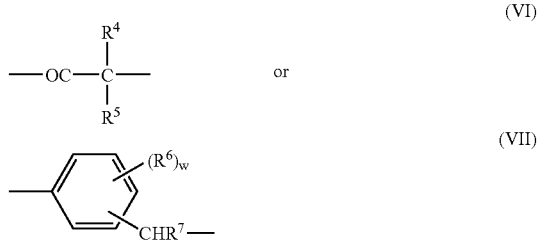

P represents a polymer chain, Hal$^2$ represents a halogen, preferably chlorine or bromine and more preferably a bromine, atom and k is from 10 to 200, preferably 10 to 100.

In the context of this specification, the term "cleaning" means "washing and/or rinsing".

A second aspect of the invention provides a method of delivering one or more laundry benefits in the cleaning of a textile fabric, the method comprising contacting the fabric with a graft polymer as defined above, preferably in the form of a laundry cleaning composition comprising said polymer, and most preferably in the form of an aqueous dispersion or solution of said composition. The method may also include the further step of cleaning the fabric subsequently after wear or use.

The second aspect of the invention may also be expressed as use of a compound for delivering a benefit to a laundry item, the compound being a graft polymer as defined above.

The second aspect of the invention may further be expressed as use of a compound in the manufacture of a laundry cleaning composition, the compound being a graft polymer as defined above.

When the benefit is soil release, the second aspect of the present invention may be expressed as a method of promoting soil release in the washing of a textile fabric, the method comprising contacting the fabric with a soil release polymer as defined in the first aspect of the present invention, preferably in the form of a laundry cleaning composition comprising said polymer, and most preferably in the form of an aqueous dispersion of solution of said composition, and subsequently after wear or use of the fabric, washing the fabric.

This aspect may also be expressed as use of a compound for promoting soil release during the washing of a textile fabric, the compound being a graft polymer as defined above.

In addition, this aspect may be expressed as use of a soil release polymer in the manufacture of a laundry cleaning composition, the soil release polymer being a graft polymer as defined above.

A third aspect of the invention provides a graft polymer as defined above for deposition onto a fabric during a laundry cleaning process.

The third aspect of the invention may also be expressed as a method of depositing a benefit agent onto a fabric, the method comprising applying a graft polymer or a composition as defined above to the fabric.

DETAILED DESCRIPTION OF THE INVENTION

Benefits

The graft polymers which form the basis of the present invention provide one or more of the following benefits, according to the compound in question: soil release, anti-redeposition, soil repellancy, colour care especially anti-dye transfer and dye fixation, anti-wrinkling, ease of ironing, fabric rebuild, anti-fibre damage, anti-pilling, anti-colour fading, dimensional stability, good drape and body, waterproofing, fabric softening and/or conditioning, fungicidal properties and insect repellancy.

Definitions

The following definitions pertain to chemical structures, molecular segments and substituents:

As used herein, the term "compound" includes materials of any molecular weight, be they simple structures which are generally considered to be monomers, dimers, trimers, higher oligomers as well as polymers.

The phrase "having the structure" is not intended to be limiting and is used in the same way that the term "comprising" is commonly used. The term "independently selected from the group consisting of" is used herein to indicate that the recited elements, eg, R groups or the like, can be identical or different.

"Optional" or "optionally" means that the subsequently described event or occurrence may or may not occur, and that the description includes instances where said event or circumstance occurs and instances where it does not. For example, the phrase "optionally substituted hydrocarbyl" means that a hydrocarbyl moiety may or may not be substituted and that the description includes both unsubstituted hydrocarbyl and hydrocarbyl where there is substitution.

The term "alkyl" as used herein refers to a branched or unbranched saturated hydrocarbon group typically although not necessarily containing 1 to about 24 carbon atoms, such as methyl, ethyl, n-propyl, isopropyl, n-butyl, isobutyl, t-butyl, octyl, decyl, and the like, as well as cycloalkyl groups such as cyclopentyl, cyclohexyl and the like. Generally, although again not necessarily, alkyl groups herein contain 1 to about 12 carbon atoms. More preferably, an alkyl group, sometimes termed a "lower alkyl" group, contains one to six carbon atoms, preferably one to four carbon atoms. "Substituted alkyl" refers to alkyl substituted with one or more substituent groups, and the terms "heteroatom-containing alkyl" and "heteroalkyl" refer to alkyl in which at least one carbon atom is replaced with a heteroatom.

The term "alkenyl" as used herein refers to a branched or unbranched hydrocarbon group typically although not necessarily containing 2 to about 24 carbon atoms and at least one double bond, such as ethenyl, n-propenyl, isopropenyl, n-butenyl, isobutenyl, octenyl, decenyl, and the like. Generally, although again not necessarily, alkenyl groups herein contain 2 to about 12 carbon atoms. More preferably, an alkenyl group, sometimes termed a "lower alkenyl" group, contains two to six carbon atoms, preferably two to four carbon atoms. "Substituted alkenyl" refers to alkenyl substituted with one or more substituent groups, and the terms "heteroatom-containing alkenyl" and "heteroalkenyl" refer to alkenyl in which at least one carbon atom is replaced with a heteroatom.

The term "alkynyl" as used herein refers to a branched or unbranched hydrocarbon group typically although not necessarily containing 2 to about 24 carbon atoms and at least one triple bond, such as ethynyl, n-propynyl, isopropynyl, n-butynyl, isobutynyl, octynyl, decynyl, and the like. Generally, although again not necessarily, alkynyl groups herein contain 2 to about 12 carbon atoms. More preferably, an alkynyl group, sometimes termed a "lower alkynyl" group, contains two to six carbon atoms, preferably three or four carbon atoms. "Substituted alkynyl" refers to alkynyl substituted with one or more substituent groups, and the terms "heteroatom-containing alkynyl" and "heteroalkynyl" refer to alkynyl in which at least one carbon atom is replaced with a heteroatom.

The term "alkoxy" as used herein intends an alkyl group bound through a single, terminal ether linkage; that is, an "alkoxy" group may be represented as —O-alkyl where alkyl is as defined above. More preferbaly, an alkoxy group, sometimes termed a "lower alkoxy" group, contains one to six, more preferably one to four, carbon atoms. The term "aryloxy" is used in a similar fashion, with aryl as defined below.

Similarly, the term "alkyl thio" as used herein intends an alkyl group bound through a single, terminal thioether linkage; that is, an "alkyl thio" group may be represented as —S-alkyl where alkyl is as defined above. More preferably, an alkythio group, sometimes termed a "lower alkyl thio" group, contains one to six, more preferably one to four, carbon atoms.

The term "aryl" as used herein, and unless otherwise specified refers to an aromatic substituent containing a single aromatic ring or multiple aromatic rings that are fused together, linked covalently, or linked to a common group such as a methylene or ethylene moiety. The common linking group may also be a carbonyl as in benzophenone, an oxygen atom as in diphenylether, or a nitrogen atom as in diphenylamine, Preferred aryl groups contain one aromatic ring or two fused or linked aromatic rings, eg, phenyl, naphthyl, biphenyl, diphenylether, diphenylamine, benzophenone, and the like. In particular embodiments, aryl substituents have 1 to about 200 carbon atoms, typically 1 to about 50 carbon atoms, and preferably 1 to about 20 carbon atoms. More preferably, aryl groups contain from 6 to 18, preferably 6 to 16 and especially 4 to 14, carbon atoms. Phenyl and naphthyl, particularly phenyl, groups are especially preferred. "Substituted aryl" refers to an aryl moiety substituted with one or more substituent groups, (eg, tolyl, mesityl and perfluorophenyl) and the terms "heteroatom-containing aryl" and "heteroaryl" refer to aryl in which at least one carbon atom is replaced with a heteroatom.

The term "aralkyl" refers to an alkyl group with an aryl substituent, and the term "aralkylene" refers to an alkylene group with an aryl substituent; the term "alkaryl" refers to an aryl group that has an alkyl substituent, and the term "alkarylene" refers to an arylene group with an alkyl substituent. Preferred aralkyl groups contain from 7 to 16, especially 7 to 10, carbon atoms, a particularly preferred aralkyl group being a benzyl group.

The terms "halo" and "halogen" are used in the conventional sense to refer to a chloro, bromo, fluoro or iodo substituent. The terms "haloalkyl," "haloalkenyl" or "haloalkynyl" (or "halogenated alkyl", "halogenated alkenyl," or "halogenated alkynyl") refer to an alkyl, alkenyl or alkynyl group, respectively, in which at least one of the hydrogen atoms in the group has been replaced with a halogen atom.

The term "heteroatom-containing" as in a "heteroatom-containing hydrocarbyl group" refers to a molecule or molecular fragment in which one or more carbon atoms is replaced with an atom other than carbon, eg, nitrogen, oxygen, sulphur, phosphorus or silicon. Similarly, the term "heteroalkyl" refers to an alkyl substituent that is heteroatom-containing, the term "heterocyclic" refers to a cyclic substituent that is heteroatom-containing, the term "heteroaryl" refers to an aryl substituent that is heteroatom-containing, and the like. When the term "heteroatom-containing" appears prior to a list of possible heteroatom-containing groups, it is intended that the term apply to every member of that group. That is, the phrase "heteroatom-containing alkyl, alkenyl and alkynyl" is to be interpreted as "heteroatom-containing alkyl, heteroatom-containing alkenyl and heteroatom-containing alkynyl." Preferably, a heterocyclic group is 3- to 18-membered, particularly a 3- to 14-membered, and especially a 5- to 10-membered ring system containing at least one heteroatom.

"Hydrocarbyl" refers to univalent hydrocarbyl radicals containing 1 to about 30 carbon atoms, preferably 1 to about 24 carbon atoms, most preferably 1 to about 12 carbon atoms, including branched or unbranched, saturated or unsaturated species, such as alkyl groups, alkenyl groups, aryl groups, and the like. The term "lower hydrocarbyl" intends a hydrocarbyl group of one to six carbon atoms, preferably one to four carbon atoms. "Substituted hydrocarbyl", refers to hydrocarbyl substituted with one or more substituent groups, and the term "heteroatom-containing hydrocarbyl" and "heterohydrocarbyl" refer to hydrocarbyl in which at least one carbon atom is replaced with a heteroatom.

By "substituted" as in "substituted hydrocarbyl," "substituted aryl," "substituted alkyl," "substituted alkenyl" and the like, as alluded to in some of the aforementioned definitions, is meant that in the hydrocarbyl, hydrocarbylene, alkyl, alkenyl or other moiety, at least one hydrogen atom bound to a carbon atom is replaced with one or more substituents that are functional groups such as hydroxyl, alkoxy, thio, phosphino, amino, halo, silyl, and the like. When the term "substituted" appears prior to a list of possible substituted groups, it is intended that the term apply to every member of that group. That is, the phrase "substituted alkyl, alkenyl and alkynyl" is to be interpreted as "substituted alkyl, substituted alkenyl and substituted alkynyl". Similarly, "optionally substituted alkyl, alkenyl and alkynyl" is to be interpreted as "optionally substituted alkyl, optionally substituted alkenyl and optionally substituted alkynyl."

When any of the foregoing substituents are designated as being optionally substituted, the substituent groups which are optionally present may be any one or more of those customarily employed in the development of laundry treatment compounds and/or the modification of such compounds to influence their structure/activity, stability or other property. Specific examples of such substituents include, for example, halogen atoms, nitro, cyano, hydroxyl, cycloalkyl, alkyl, haloalkyl, cycloalkyloxy, alkoxy, haloalkoxy, amino, alkylamino, dialkylamino, formyl, alkoxycarbonyl, carboxyl, alkanoyl, alkylthio, alkylsulphinyl, alkylsulphonyl, alkylsulphonato, carbamoyl and alkylamido groups. When any of the foregoing substituents represents or contains an alkyl substituent group, this may be linear or branched and may contain up to 12, preferably up to 6, and especially up to 4, carbon atoms. A cycloalkyl group may contain from 3 to 8, preferably from 3 to 6, carbon atoms. A halogen atom may be a fluorine, chlorine, bromine or iodine atom and any group which contains a halo moiety, such as a haloalkyl group, may thus contain any one or more of these halogen atoms.

The term "amino" is used herein to refer to the group —$NZ^1Z^2$, where each of $Z^1$ and $Z^2$ is independently selected from the group consisting of hydrido and optionally substituted alkyl, alkenyl, alkynyl, aryl, aralkyl, alkaryl and heterocyclic.

The term "thio" is used herein to refer to the group —$SZ^1$, where $Z^1$ is selected from the group consisting of hydrido and optionally substituted alkyl, alkenyl, alkynyl, aryl, aralkyl, alkaryl and heterocyclic.

As used herein all reference to the elements and groups of the Periodic Table of the Elements is to the version of the table published by the Handbook of Chemistry and Physics, CRC Press, 1995, which sets forth the new IUPAC system for numbering groups.

The term "soil release polymer" is used in the art to cover polymeric materials which assist release of soil from fabrics, eg cotton or polyester based fabrics. For example, it is used in relation to polymers which assist release of soil direct from fibres. It is also used to refer to polymers which modify the fibres so that dirt adheres to the polymer-modified fibres rather than to the fibre material itself. Then, when the fabric is washed the next time, the dirt is more easily removed than if it was adhering the fibres. Although not wishing to be bound by any particular theory or explanation, the inventors believe that those compounds utilised in the present invention which deliver a soil release benefit, probably exert their effect mainly by the latter mechanism.

As those of skill in the art of polysaccharide, especially cellulosic, polymers recognise, the term "degree of substitution" (or DS) refers to substitution of the functional groups on the repeating sugar unit. In the case of cellulosic polymers, DS refers to substitution of the three hydroxyl groups on the repeating anhydroglucose unit. Thus, for cellulose polymers, the maximum degree of substitution is 3. DS values do not generally relate to the uniformity of substitution of chemical groups along the polysaccharide molecule and are not related to the molecular weight of the polysaccharide backbone. The average degree of substitution groups is preferably from 0.1 to 3 (eg. from 0.3 to 3), more preferably from 0.1 to 1 (eg. from 0.3 to 1).

The Polysaccharide before Substitution

As used herein, the term "polysaccharides" includes natural polysaccharides, synthetic polysaccharides, polysaccharide derivatives and modified polysaccharides. Suitable polysaccharides for use in preparing the compounds of the present invention include, but are not limited to, gums, arabinans, galactans, seeds and mixtures thereof as well as cellulose and derivatives thereof.

Suitable polysaccharides that are useful in the present invention include polysaccharides with a degree of polymerisation (DP) over 40, preferably from about 50 to about 100,000, more preferably from about 500 to about 50,000. Constituent saccharides preferably include, but are not limited to, one or more of the following saccharides: isomaltose, isomaltotriose, isomaltotetraose, isomaltooligosaccharide, fructooligosaccharide, levooligosaccharides, galactooligosaccharide, xylooligosaccharide, gentiooligosaccharides, disaccharides, glucose, fructose, galactose, xylose, mannose, sorbose, arabinose, rhamnose, fucose, maltose, sucrose, lactose, maltulose, ribose, lyxose, allose, altrose, gulose, idose, talose, trehalose, nigerose, kojibiose, lactulose, oligosaccharides, maltooligosaccharides, trisaccharides, tetrasaccharides, pentasaccharides, hexasaccharides, oligosaccharides from partial hydrolysates of natural polysaccharide sources and mixtures thereof.

The polysaccharides can be extracted from plants, produced by organisms, such as bacteria, fungi, prokaryotes, eukaryotes, extracted from animal and/or humans. For example, xanthan gum can be produced by *Xanthomonas campestris*, gellan by *Sphingomonas paucimobilis*, xyloglucan can be extracted from tamarind seed.

The polysaccharides can be linear, or branched in a variety of ways, such as 1-2, 1-3, 1-4, 1-6, 2-3 and mixtures thereof. Many naturally occurring polysaccharides have at least some degree of branching, or at any rate, at least some saccharide rings are in the form of pendant side groups on a main polysaccharide backbone.

It is desirable that the polysaccharides of the present invention have a molecular weight in the range of from about 10,000 to about 10,000,000, more preferably from about 50,000 to about 1,000,000, most preferably from about 50,000 to about 500,000.

Preferably, the polysaccharide is selected from the group consisting of: tamarind gum (preferably consisting of xyloglucan polymers), guar gum, locust bean gum (preferably consisting of galactomannan polymers), and other industrial gums and polymers, which include, but are not limited to, Tara, Fenugreek, Aloe, Chia, Flaxseed, Psyllium seed, quince seed, xanthan, gellan, welan, rhamsan, dextran, curdlan, pullulan, scleroglucan, schizophyllan, chitin, hydroxyalkyl cellulose, arabinan (preferably from sugar beets), de-branched arabinan (preferably from sugar beets), arabinoxylan (preferably from rye and wheat flour), galactan (preferably from lupin and potatoes), pectic galactan (preferably from potatoes), galactomannan (preferably from carob, and including both low and high viscosities), glucomannan, lichenan (preferably from icelandic moss), mannan (preferably from ivory nuts), pachyman, rhamnogalacturonan, acacia gum, agar, alginates, carrageenan, chitosan, clavan, hyaluronic acid, heparin, inulin, cellodextrins, cellulose, cellulose derivatives and mixtures thereof. These polysaccharides can also be treated (preferably enzymatically) so that the best fractions of the polysaccharides are isolated.

Polysaccharides can be used which have an $\alpha$- or $\beta$-linked backbone. However, more preferred polysaccharides have a $\beta$-linked backbone, preferably a $\beta$-1,4 linked backbone. It is preferred that the $\beta$-1,4-linked polysaccharide is cellulose; a cellulose derivative, particularly cellulose sulphate, cellulose acetate, sulphoethyl cellulose, cyanoethyl cellulose, methyl cellulose, ethyl cellulose, carboxymethylcellulose, hydroxyethylcellulose or hydroxypropylcellulose; a xyloglucan, particularly one derived from Tamarind seed gum; a glucomannan, particularly Konjac glucomannan; a galactomannan, particularly Locust Bean gum and Guar gum; a side chain branched galactomannan, particulalry Xanthan gum; chitosan or a chitosan salt. Other $\beta$-1,4-linked polysaccharides having an affinity for cellulose, such as mannan, are also preferred.

The natural polysaccharides can be modified with amines (primary, secondary, tertiary), amides, esters, ethers, urethanes, alcohols, carboxylic acids, tosylates, sulphonates, sulphates, nitrates, phosphates and mixtures thereof. Such a modification can take place in position 2, 3 and/or 6 of the saccharide unit. Such modified or derivatised polysaccharides can be included in the compositions of the present invention in addition to the natural polysaccharides.

Nonlimiting examples of such modified polysaccharides include: carboxyl and hydroxymethyl substitutions (eg glucuronic acid instead of glucose); amino polysaccharides (amine substitution, eg glucosamine instead of glucose); $C_1$–$C_6$ alkylated polysaccharides; acetylated polysaccharide ethers; polysaccharides having amino acid residues attached (small fragments of glycoprotein); polysaccharides containing silicone moieties. Suitable examples of such modified polysaccharides are commercially available from Carbomer and include, but are not limited to, amino alginates, such as hexanediamine alginate, amine functionalised cellulose-like O-methyl-(N-1,12-dodecanediamine) cellulose, biotin heparin, carboxymethylated dextran, guar polycarboxylic acid, carboxymethylated locust bean gum, carboxymethylated xanthan, chitosan phosphate, chitosan phosphate sulphate, diethylaminoethyl dextran, dodecylamide alginate, sialic acid, glucuronic acid, galacturonic acid, mannuronic acid, guluronic acid, N-acetylgluosamine, N-acetylgalactosamine, and mixtures thereof.

Especially preferred polysaccharides include cellulose, ether, ester and urethane derivatives of cellulose, particularly cellulose monoacetate, xyloglucans and galactomannans, particularly Locust Bean gum.

It is preferred that the polysaccharide has a total number of sugar units from 10 to 7000, although this figure will be dependent on the type of polysaccharide chosen, at least to some extent.

In the case of cellulose and water-soluble modified celluloses, the total number of sugar units is preferably from 50 to 1000, more preferably 50 to 750 and especially 200 to 300. The preferred molecular weight of such polysaccharides is from 10 000 to 150 000.

In the case of cellulose monoacetate, the total number of sugar units is from 10 to 200, preferably 100 to 150. The preferred molecular weight is from 10 000 to 20 000.

In the case of Locust Bean gum, the total number of sugar units is preferably from 50 to 7000. The preferred molecular weight is from 10 000 to 1 000 000.

In the case of xyloglucan, the total number of sugar units is preferably from 1000 to 3000. the preferred molecular weight is from 250 000 to 600 000.

The polysaccharide can be linear, like in hydroxyalkyl cellulose, it can have an alternating repeat like in carrageenan, it can have an interrupted repeat like in pectin, it can be a block copolymer like in alginate, it can be branched like in dextran, or it can have a complex repeat like in xanthan. Descriptions of the polysaccharides are given in "An introduction to Polysaccharide Biotechnology", by M. Tombs and S. E. Harding, T. J. Press 1998.

The Graft Polymers

The graft polymers utilised in the invention are polysaccharides in which at least one sugar unit of the polysaccharide has been substituted by a group of the general formula

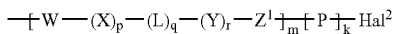

in which k, m, p, q, r, P, W, X, L, Y and $Z^1$ and $Hal^2$ are as defined below.

The graft polymers have the general formula

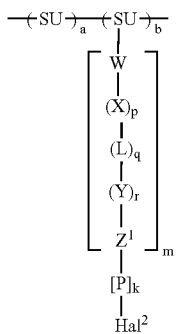

(IV)

in which each SU represents a sugar unit in a polysaccharide backbone;

a represents the number of unsubstituted sugar units as a percentage of the total number of sugar units and is in the range from 0 to 99.9%, preferably 65 to 99%, more preferably 80 to 99%;

b represents the number of substituted sugar units as a percentage of the total number of sugar units and is in the range from 0.1 to 100%, preferably 1 to 35%, more preferably 1 to 20%;

m represents the degree of substitution per sugar unit and is from 1 to 3;

W represents a group —O— or —$NR^1$—, where $R^1$ represents a hydrogen atom or an optionally substituted alkyl group, preferably a hydrogen atom;

p, q and r are each independently 0 or 1;

L represents an optionally substituted alkylene, cycloalkylene, arylene or heteroarylene group;

X and Y each independently represent a group —$CH_2$—, —CO—, —O—CO—, —CO—O—, —NH—CO—, —CO—NH—, —CH(OH)—$CH_2$—, —$CH_2$—CH(OH)—, —$CH_2$—O—CO—, —CO—O—$CH_2$—, —$CH_2$_CO—O—, —O—CO—$CH_2$—, —O—CO—NH—, —NH—CO—O—, —$(CR^2R^3)_s$—CO—, —CO—$(CR^2R^3)_s$—, —$(CR^2R^3)_t$—O—, —O—$(CR^2R^3)_t$—, —$(CR^2R^3)_u$—SO—, —SO—$(CR^2R^3)_u$—, —$(CR^2R^3)_v$—$SO_2$—, —$SO_2$—$(CR^2R^3)_v$— or —NH—CO—NH, where s, t, u and v are each independently 0, 1, 2 or 3 and $R^2$ and $R^3$ each independently represent a hydrogen atom or an optionally substituted alkyl group, preferably a hydrogen atom;

$Z^1$ represents a group

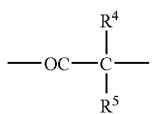

(VI)

or

-continued

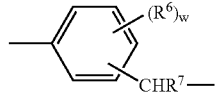

(VII)

P represents a polymer chain, $Hal^2$ represents a halogen, preferably chlorine or bromine and more preferably a bromine, atom and k is from 10 to 200, preferably 10 to 100.

The group W is derived from the polysaccharide substrate. Thus, W may be —O— in the case of polysaccharides such as cellulose monoacetate or Locust Bean gum or —W— may be —NH— in the case of polysaccharides such as chitosan and its salts. It is particularly preferred that W is —O—.

Preferably, L represents a $C_{1-6}$ alkylene (particularly $C_{1-4}$ alkylene and especially methylene) group, a $C_{3-8}$ (particularly $C_{3-6}$ and especially $C_5$ or $C_6$) cycloalkylene group, a $C_{6-14}$ arylene (particularly $C_{6-10}$ arylene and especially phenylene) group or a 5- to 14-membered heteroarylene (particularly 5- to 10-membered heteroarylene and especially triazine, specifically 1,3,5,-triazine) group, each group being optionally substituted by one or more halogen atoms, $C_{1-4}$ alkyl or $C_{1-4}$ groups. More preferably, L, if present, represents a methylene or triazine group, with a methylene group being especially preferred.

It is preferred that X and Y each independently represent a group —$CH_2$—, —CO—, —O—CO—, —CO—O—, —NH—CO—, —CO—NH—, —CH(OH)—$CH_2$—, —$CH_2$—CH(OH)—, —$CH_2$—O—CO—, —CO—O—$CH_2$—, —$CH_2$_CO—O—, —O—CO—$CH_2$—, —O—CO—NH—, —NH—CO—O—, —$(CR^2R^3)_s$—CO—, —CO—$(CR^2R^3)_s$—, —$(CR^2R^3)_t$—O—, —O—$(CR^2R^3)_t$—, —$(CR^2R^3)_u$—SO—, —SO—$(CR^2R^3)_u$—, —$(CR^2R^3)_v$—$SO_2$—, —$SO_2$—$(CR^2R^3)_v$— or —NH—CO—NH, where s, t, u and v are each independently 0, 1, 2 or 3 and $R^2$ and $R^3$ each independently represent a hydrogen atom or an optionally substituted alkyl group, preferably a hydrogen atom. If $R^2$ and/or $R^3$ represents an optionally substituted alkyl group, this is preferably a $C_{1-6}$, especially a $C_{1-4}$, alkyl group optionally substituted by one or more halogen atoms, $C_{1-4}$ alkyl or $C_{1-4}$ alkoxy groups. Preferably, X and Y, if present (ie p and/or r is 1) independently represent a group —$CH_2$—, —CO—, —O—CO—, —CO—O—, —NH—CO—, —CO—NH—, —CH(OH)—$CH_2$—, —$CH_2$CH(OH)—, —$CH_2$—O—CO, —CO—O—$CH_2$—, —$CH_2$—CO—O—, —O—CO—$CH_2$—, —O—CO—NH—, —NH—CO—O—, —$CH_2$_$CH_2$—CO—, —CO—$CH_2$—$CH_2$—, —$(CR^2R^3)_t$—O—, —O—$(CR^2R^3)_t$—, —$CH_2$—$CH_2$—SO—, —SO—$CH_2$—$CH_2$—, —$CH_2$—$CH_2$—$SO_2$—, —$SO_2$—$CH_2$—$CH_2$— or —NH—CO—NH— where t is 1 or 2 and $R^2$ and $R^3$ both represent a hydrogen atom.

More preferably, X and Y, if present, independently represent a group —$CH_2$—, —CO—, —CO—NH— or —NH—CO—, with the groups —$CH_2$— and —CO— being especially preferred.

In one preferred embodiment, $Z^1$ represents a group of formula VI in which $R^4$ and $R^5$ each independently represent an optionally substituted alkyl, cycloalkyl or aralkyl group.

Preferably, $R^4$ and $R^5$ each independently represent a $C_{1-6}$ (especially $C_{1-4}$) alkyl, $C_{3-8}$ (especially $C_{3-6}$) cycloalkyl or $C_{7-14}$ (especially $C_{7-10}$) aralkyl (particularly benzyl) group, each group being optionally substituted by one or more halogen atoms, $C_{1-4}$ alkyl or $C_{1-4}$ alkoxy groups. More preferably, $R^4$ and $R^5$ independently represent a $C_{1-4}$ alkyl, especially a methyl group.

In a particularly preferred embodiment, $R^4$ and $R^5$ both represent a methyl group.

In an alternative preferred embodiment, $Z^1$ represents a group of formula VII in which w is 0, 1 2, 3 or 4; $R^6$ represents a halogen atom or an optionally substituted alkyl group; and $R^7$ represents a hydrogen atom or an optionally substituted alkyl group.

Preferably, $R^6$, if present, represents a halogen atom or a $C_{1-6}$ (especially $C_{1-4}$) alkyl group optionally substituted by one or more halogen atoms. Preferably, w is 0. $R^7$ preferably represents a hydrogen atom or a $C_{1-6}$ (especially $C_{1-4}$) alkyl group optionally substituted by one or more halogen atoms. More preferably, $R^7$ represents a hydrogen atom.

In a particularly preferred embodiment, w is 0 and $R^7$ represents a hydrogen atom.

Grafted polymers in which W represents a group —O— or —NH—, p, q and r are 0 and $Z^1$ represents a group —CO—C(CH$_3$)$_2$— are also preferred.

Another preferred group of grafted polmers are those in which W represents a group —O— or —NH—, p and q are both 0, r is 1, Y represents a group —CH$_2$— or —CO— and Z represents a 4-(methylene)phenyl group.

It is preferred that the polysaccharide backbone in the graft polymers is β-linked, preferably β-1,4-linked.

Preferably, the polysaccharide backbone is selected from the group consisting of cellulose, cellulose derivatives (preferably cellulose sulphate, cellulose acetate, sulphoethyl cellulose, cyanoethyl cellulose, methyl cellulose, ethyl cellulose, carboxymethylcellulose, hydroxyethylcellulose or hydroxypropylcellulose), xyloglucans (preferably those derived from Tamarind seed gum), glucomannans (preferably Konjac glucomannan), galactomannans (preferably Locust Bean gum, Guar gum and Xanthan gum), chitosan and chitosan salts.

In one preferred embodiment, the graft polymers have the general formula:

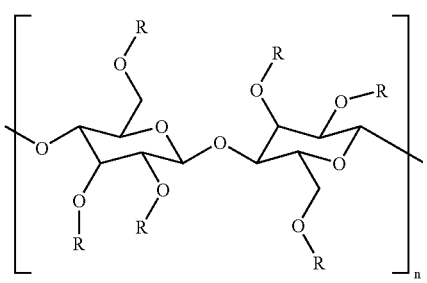

(II)

wherein at least one or more —OR groups of the polymer are independently replaced by a group

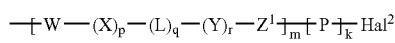

in which k, m, p, q, r, W, X, L, Y, $Z^1$, P and Hal$^2$ are as defined above and at least one or more R groups are independently selected from groups of formulae:

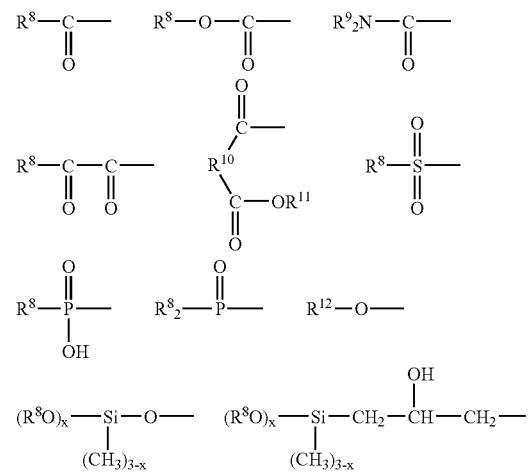

wherein each $R^8$ is independently selected from $C_{1-20}$ (preferably $C_{1-6}$) alkyl, $C_{2-20}$ (preferably $C_{2-6}$) alkenyl (eg vinyl) and $C_{5-7}$ aryl (eg phenyl) any of which is optionally substituted by one or more substituents independently selected from $C_{1-4}$ alkyl, $C_{1-12}$ (preferably $C_{1-4}$) alkoxy, hydroxyl, vinyl and phenyl groups;

each $R^9$ is independently selected from hydrogen and groups $R^8$ as hereinbefore defined;

$R^{10}$ is a bond or is selected from $C_{1-4}$ alkylene, $C_{2-4}$ alkenylene and $C_{5-7}$ arylene (eg phenylene) groups, the carbon atoms in any of these being optionally substituted by one or more substituents independently selected from $C_{1-12}$ (preferably $C_{1-4}$) alkoxy, vinyl, hydroxyl, halo and amine groups;

each $R^{11}$ is independently selected from hydrogen, counter cations such as alkali metal (preferably Na) or ½Ca or ½Mg, and groups $R^8$ as hereinbefore defined;

$R^{12}$ is selected from $C_{1-20}$ (preferably $C_{1-6}$) alkyl, $C_{2-20}$ (preferably $C_{2-6}$) alkenyl (eg vinyl) and $C_{5-7}$ aryl (eg phenyl), any of which is optionally substituted by one or more substituents independently selected from $C_{1-4}$ alkyl, $C_{1-12}$ (preferably $C_{1-4}$) alkoxy, hydroxyl, carboxyl, cyano, sulphonato, vinyl and phenyl groups;

x is from 1 to 3; and groups R which together with the oxygen atom forming the linkage to the respective saccharide ring forms an ester or hemi-ester group of a tricarboxylic- or higher polycarboxylic- or other complex acid such as citric acid, an amino acid, a synthetic amino acid analogue or a protein;

any remaining R groups being selected from hydrogen and ether substituents.

It is particularly preferred that $R^{12}$ is a methyl, ethyl, phenyl, hydroxyethyl, hydroxypropyl, carboxymethyl, sulphoethyl or cyanoethyl group.

For the avoidance of doubt, as already mentioned, in formula (II), some of the R groups may optionally have one or more structures, for example as hereinbefore described.

For example, one or more R groups may simply be hydrogen or an alkyl group.

Preferred groups may for example be independently selected from one or more of acetate, propanoate, trifluoroacetate, 2-(2-hydroxy-1-oxopropoxy) propanoate, lactate, glycolate, pyruvate, crotonate, isovalerate cinnamate, formate, salicylate, carbamate, methylcarbamate, benzoate, gluconate, methanesulphonate, toluene, sulphonate, groups and hemiester groups of fumaric, malonic, itaconic, oxalic, maleic, succinic, tartaric, aspartic, glutamic, and malic acids.

Particularly preferred such groups are the monoacetate, hemisuccinate, and 2-(2-hydroxy-1-oxopropoxy)propanoate. The term "monoacetate" is used herein to denote those acetates with the degree of substitution of about 1 or less on a cellulose or other β-1,4 polysaccharide backbone. Thus, "cellulose monoacetate" refers to a molecule that has acetate esters in a degree of substitution of about 1.1 or less, preferably about 1.1 to about 0.5. "Cellulose triacetate" refers to a molecule that has acetate esters in a degree of substitution of about 2.7 to 3.

Cellulose esters of hydroxyacids can be obtained using the acid anhydride in acetic acid solution at 20–30° C. and in any case below 50° C. When the product has dissolved the liquid is poured into water (b.p. 316,160). Tri-esters can be converted to secondary products as with the triacetate. Glycollic and lactic ester are most common.

Cellulose glycollate may also be obtained from cellulose chloracetate (GB-A-320 842) by treating 100 parts with 32 parts of NaOH in alcohol added in small portions.

An alternative method of preparing cellulose esters consists in the partial displacement of the acid radical in a cellulose ester by treatment with another acid of higher ionisation constant (FR-A-702 116). The ester is heated at about 100° C. with the acid which, preferably, should be a solvent for the ester. By this means cellulose acetate-oxalate, tartrate, maleate, pyruvate, salicylate and phenylglycollate have been obtained, and from cellulose tribenzoate a cellulose benzoate-pyruvate. A cellulose acetate-lactate or acetate-glycollate could be made in this way also. As an example cellulose acetate (10 g.) in dioxan (75 ml.) containing oxalic acid (10 g.) is heated at 100° C. for 2 hours under reflux.

Multiple esters are prepared by variations of this process. A simple ester of cellulose, eg the acetate, is dissolved in a mixture of two (or three) organic acids, each of which has an ionisation constant greater than that of acetic acid (1.82× 10⁻⁵). With solid acids suitable solvents such as propionic acid, dioxan and ethylene dichloride are used. If a mixed cellulose ester is treated with an acid this should have an ionisation constant greater than that of either of the acids already in combination.

A cellulose acetate-lactate-pyruvate is prepared from cellulose acetate, 40 per cent. acetyl (100 g.), in a bath of 125 ml. pyruvic acid and 125 ml. of 85 per cent. lactic acid by heating at 100° C. for 18 hours. The product is soluble in water and is precipitated and washed with ether-acetone. M.p. 230–250° C.

In the case when solubilising groups are attached to the polysaccharide, this is typically via covalent bonding and, may be pendant upon the backbone or incorporated therein. The type of solubilising group may alter according to where the group is positioned with respect to the backbone.

The molecular weight of the substituted polysaccharide part may typically be in the range of 1,000 to 2,000,000, for example 10,000 to 1,500,000.

It is preferred that m is from 1 to 2, preferably 1.

The various substituted polysaccharides or macroinitiators of the present invention work for any radically polymerisable monomer, especially an alkene monomer, including (meth)acrylates, styrenes and dienes. They also provide various controlled copolymers, including block, random, star, gradient, graft or "comb", hyperbranched and dendritic (co)polymers. (In the present application, "(co)polymer" refers to a homopolymer, copolymer, or mixture thereof).

Preferably, P is a single polymer chain, a random copolymer of two or more monomers or a gradient block copolymer of two or more monomers.

In the present invention, any radically polymerisable alkene can serve as a monomer for polymerisation. However, monomers suitable for polymerisation according to one embodiment of the present invention include those of the formula:

(V)

wherein $R^{13}$ and $R^{14}$ are independently selected from the group consisting of H, halogen, CN, $CF_3$, straight or branched $C_{1-20}$ (preferably $C_{1-6}$, more preferably $C_{1-4}$) alkyl, α, β-unsaturated straight or branched $C_{2-10}$ (preferably $C_{2-6}$, more preferably $C_{2-4}$) alkenyl or alkynyl, α, β-unsaturated straight or branched $C_{2-6}$ alkenyl (preferably vinyl) substituted (preferably at the α-position) with a halogen (preferably chlorine), $C_3$–$C_8$ cycloalkyl, heterocyclyl, $C(=T)R^{17}$, $C(=T)$ $NR^{18}R^{19}$ and $TC(=T)R^{20}$, where T may be $NR^{20}$ or O (preferably O), $R^{17}$ is $C_{1-20}$ alkyl, $C_{1-20}$ alkoxy, aryloxy or heterocyclyloxy, $R^{18}$ and $R^{19}$ are independently H or $C_{1-20}$ alkyl or $R^{18}$ and $R^{19}$ may be joined together to form an alkylene group of from 2 to 5 carbon atoms, thus forming a 3- to 6-membered ring, and $R^{20}$ is H, straight or branched $C_{1-20}$ alkyl or aryl; and $R^{15}$ and $R^{16}$ are independently selected from the group consisting of H, halogen (preferably fluorine or chlorine), $C_{1-6}$ (preferably $C_1$) alkyl, and $COOR^{21}$ and $CONHR^{21}$ (where $R^{21}$ is H, an alkali metal, or a $C_{1-6}$ alkyl group optionally substituted by a hydroxy, amino, $C_{1-6}$ alkylamino or di($C_{1-6}$ alkyl)amino group); or a heterocyclyl group optionally substituted by a $C_{1-6}$ alkyl or hydroxy $C_{1-6}$ alkyl group; or $R^{13}$ and $R^{15}$ may be joined to form a group of the formula $(CH_2)$ n' (which may be substituted with from 1 to 2n' halogen atoms or $C_{1-4}$ alkyl groups) or $C(=O)$-T-$C(=O)$, where n' is from 2 to 6 (preferably 3 or 4) and T is as defined above; and at least two of $R^{13}$, $R^{14}$, $R^{15}$ and $R^{16}$ are H or halogen.

In another preferred embodiment, P represents a polymer chain derived from a monomer selected from the group consisting of sodium methacrylate, t-butylaminoethyl methacrylate, dimethylaminoethyl methacrylate, diethylaminoethyl methacrylate, dimethylaminopropyl methacrylamide, hydroxyethyl methacrylate, hydroxypropyl methacrylate, hydroxyethylmorpholine methacrylate, 2-methacryloxyethyl glucoside, methoxypolyethyleneglycol methacrylate, glycerol monomethacrylate, 2-(sulphooxy)ethyl methacrylate ammonium salt, 3-sulphopropyl methacrylate potassium salt, [2-(methacryloxy)ethyl]dimethyl(3-sulphopropyl)-ammonium hydroxide inner salt, 4-vinyl benzoic acid and 4-styrenesulphonic acid sodium salt.

A second monomer can also be used to form copolymeric grafts. This can be any of those listed above. However, in a further preferred embodiment, P represents a polymer chain which is a copolymer derived from a monomer as listed in the previous paragraph and a hydrophobic monomer selected from the group consisting of alkyl methacrylates (eg stearyl methacrylate), perfluoroalkyl methacrylates (eg 1H,1H,2H,2H-heptadeca-fluorodecyl methacrylate), and siloxane methacrylates (eg monomethacryloxypropyl terminated polydimethylsiloxane).

Preferably, the grafts have a number average molecular weight of from 1000 to 200 000, more preferably 1000 to 100 000.

Preferably, the polysaccharide backbone has a number average molecular weight from 10 000 to 1 000 000.

It is also preferred that the polymer is water soluble at a concentration of at least 0.2 mg/ml.

Synthesis of Graft Polymers

The graft polymers utilised in the invention can be prepared by the following process. This process comprises polymerising at least one free radically polymerisable monomer from the control agent site of a macroinitiator in the presence of a transition metal compound and a ligand, and isolating the (co)polymer so formed.

The transition metal compound may be any transition metal compound which can participate in a redox cycle with the initiator and dormant polymer chain, but which does not form a direct carbon-metal bond with the polymer chain. Preferred transition metal compounds are those of the formula $M^{j+}N_j$, where $M^{j+}$ may be selected from the group consisting of $Cu^{1+}$, $Cu^{2+}$, $Fe^{2+}$, $Fe^{3+}$, $Ru^{2+}$, $Ru^{3+}$, $Cr^{2+}$, $Cr^{3+}$, $Mo^0$, $Mo^+$, $Mo^{2+}$, $Mo^{3+}$, $W^{2+}$, $W^{3+}$, $R^{3+}$, $R^{4+}$, $Co^+$, $Co^{2+}$, $Re^{2+}$, $Re^{3+}$, $Ni^0$, $Ni^+$, $Mn^{3+}$, $Mn^{4+}$, $V^{2+}$, $V^{3+}$, $Zn^+$, $Zn^{2+}$, $Au^+$, $Au^{2+}$, $Ag^+$ and $Ag^{2+}$;

N is selected from the group consisting of halogen, $C_{1-6}$ alkoxy, $(SO_4)_{1/2}$, $(PO_4)_{1/3}$, $(HPO_4)_{1/2}$, $(H_2PO_4)$, triflate, hexafluorophosphate, methanesulphonate, arylsulphonate (preferably benzenesulphonate or toluenesulphonate), CN, $R^{22}CO_2$, and $SeR^{23}$ where $R^{22}$ is H or a straight or branched $C_{1-6}$ alkyl (preferably methyl) which may be substituted from 1 to 5 times with a halogen atom (preferably 1 to 3 times with a fluorine or chlorine) and $R^{23}$ is aryl or a straight or branched $C_{1-20}$ (preferably $C_{1-10}$) alkyl group; and j is the formal charge on the metal (eg, $0 \leq j \leq 7$).

Preferably, the transition metal compound is a copper (I) halide, especially copper (I) bromide.

Suitable ligands for use in the present invention include ligands having one or more nitrogen, oxygen, phosphorus and/or sulphur atoms which can coordinate to the transition metal through a σ-bond, ligands containing two or more carbon atoms which can coordinate to the transition metal through a π-bond, and ligands which can coordinate to the transition metal through a μ-bond or a η-bond. However, preferred N-, O-, P- and S- containing ligands may have one of the following formulas:

$R^{24}$-J-$R^{25}$ $R^{24}$-J-$(R^{26}$-J$)_h$-$R^{25}$ wherein $R^{24}$ and $R^{25}$ are independently selected from the group consisting of H, $C_{1-20}$ alkyl, aryl, heterocyclyl, and $C_{1-6}$ alkyl substituted with $C_{1-6}$ alkoxy, $C_{1-4}$ dialkylamino, C(=T)$R^{17}$, C(=T)$R^{18}R^{19}$ and TC(=T)$R^{20}$, where T, $R^{17}$, $R^{18}$, $R^{19}$ and $R^{20}$ are as defined above; or $R^{24}$ and $R^{25}$ can be joined to form a saturated, unsaturated or heterocyclic ring as described above for the "heterocyclyl" group;

Z is O, S, $NR^{27}$ or $PR^{27}$, where $R^{27}$ is selected from the same group as $R^{24}$ and $R^{25}$, each $R^{26}$ is independently a divalent group selected from the group consisting of $C_{2-4}$ alkylene (alkanediyl) and $C_{2-4}$ alkenylene where the covalent bonds to each Z are at vicinal positions (eg, in a 1,2-arrangement) or at β-positions e,g., in a 1,3-arrangement), and from $C_{3-8}$ cycloalkanediyl, $C_{3-8}$ cycloalkenediyl, arenediyl and heterocyclylene where the covalent bonds to each Z are at vicinal positions; and h is from 1 to 6.

In addition to the above ligands, each of $R^{24}$-J and $R^{25}$-J can form a ring with the $R^{26}$ group to which the J is bound to form a linked or fused heterocyclic ring system (such as is described above for "heterocyclyl"). Alternatively, when $R^{24}$ and/or $R^{25}$ are heterocyclyl, J can be a covalent bond (which may be single or double), $CH_2$ or a 4- to 7-membered ring fused to $R^{24}$ and/or $R^{25}$, in addition to the definitions given above for J. Exemplary ring systems for the present ligand include bipyridine, bipyrrole, 1,10-phenanthroline, a cryptand, a crown ether, etc.

Where Z is $PR^{27}$, $R^{27}$ can also be $C_{1-20}$-alkoxy.

Also included as suitable ligands in the present invention are CO (carbon monoxide), porphyrins and porphycenes, the latter two of which may be substituted with from 1 to 6 (preferably from 1 to 4) halogen atoms, $C_{1-6}$ alkyl groups, $C_{1-6}$-alkoxy groups, $C_{1-6}$ alkoxycarbonyl, aryl groups, heterocyclyl groups, and $C_{1-6}$ alkyl groups further substituted with from 1 to 3 halogens.

Further ligands suitable for use in the present invention include compounds of the formula $R^{28}R^{29}$ C(C(=T)$R^{17}$)$_2$, where T and $R^{17}$ are as defined above, and each of $R^{28}$ and $R^{29}$ is independently selected from the group consisting of H, halogen, $C_{1-20}$ alkyl, aryl and heterocyclyl, and $R^{28}$ and $R^{29}$ may be joined to form a $C_{3-8}$ cycloalkyl ring or a hydrogenated (ie, reduced, non-aromatic or partially or fully saturated) aromatic or heterocyclic ring (consistent with the definitions of "aryl" and "heterocyclyl" above), any of which (except for H and halogen) may be further substituted with 1 to 5 and preferably 1 to 3 $C_{1-6}$ alkyl groups, $C_{1-6}$ alkoxy groups, halogen atoms and/or aryl groups. Preferably, one of $R^{28}$ and $R^{29}$ is H or a negative charge.

Additional suitable ligands include, for example, ethylenediamine and propylenediamine, both of which may be substituted from one to four times on the amino nitrogen atom with a $C_{1-4}$ alkyl group or a carboxymethyl group; aminoethanol and aminopropanol, both of which may be substituted from one to three times on the oxygen and/or nitrogen atom with a $C_{1-4}$ alkyl group; ethylene glycol and propylene glycol, both of which may be substituted one or two times on the oxygen atoms with a $C_{1-4}$ alkyl group; diglyme, triglyme, tetraglyme, etc.

Suitable carbon-based ligands include arenes (as described above for the "aryl" group) and the cyclopentadienyl ligand. Preferred carbon-based ligands include benzene (which may be substituted with from one to six $C_{1-4}$ alkyl groups>eg, methyl!) and cyclopentadienyl (which may be substituted with from one to five methyl groups, or which may be linked through an ethylene or propylene chain to a second cyclopentadienyl ligand). Where the cyclopentadienyl ligand is used, it may not be necessary to include a counteranion (N) in the transition metal compound.

Preferred ligands include unsubstituted and substituted pyridines and bipyridines, acetonitrile, $(R^{30}O)_3$ P, $PR^{30}_3$, 1,10-phenanthroline, porphyrin, cryptands such as $K_{222}$ and crown ethers such as 18-crown-6. The most preferred ligands are bipyridine and $(R^{30}O)_3$ P where $R^{30}$ is $C_{1-20}$ alkyl optionally substituted by one or more halogen (preferably fluorine or chlorine atoms, $C_{2-20}$ alkenyl (preferably vinyl), $C_{2-10}$ alkynyl (preferably acetylenyl), phenyl optionally substituted by one or more halogen or $C_{1-4}$ alkyl groups or phenyl $C_{1-6}$ alkyl.

In the present polymerisation, the amounts and relative proportions of initiator, transition metal compound and ligand are those effective to conduct this type of polymerisation which is known as atom transfer radical polymerisation (ATRP). Initiator efficiencies with the present initiator/transition metal compound/ligand system are generally very good (at least 50%, preferably ≧80%, more preferably ≧90%). Accordingly, the amount of initiator can be selected such that the initiator concentration is from $10^4$ M to 1M, preferably $10^{-3}"10^{-1}$ M. Alternatively, the initiator can be present in a molar ratio of from $10^{-4}$:1 to $10^{-1}$:1, preferably from $10^{-3}$:1 to $5 \times 10^{-2}$:1, relative to monomer. An initiator concentration of 0.1–1M is particularly useful for preparing end-functional polymers.

The molar proportion of transition metal compound relative to initiator is generally that which is effective to polymerize the selected monomer(s), but may be from 0.0001:1 to 10:1, preferably from 0.1:1 to 5:1, more preferably from 0.3:1 to 2:1, and most preferably from 0.9:1 to 1.1:1. Conducting the polymerisation in a homogeneous system may permit reducing the concentration of transition metal and ligand such that the molar proportion of transition metal compound to initiator is as low as 0.001:1.

Similarly, the molar proportion of ligand relative to transition metal compound is generally that which is effective to polymerize the selected monomer(s), but can depend upon the number of coordination sites on the transition metal compound which the selected ligand will occupy. (One of ordinary skill understands the number of coordination sites on a given transition metal compound which a selected ligand will occupy.) The amount of ligand may be selected such that the ratio of (a) coordination sites on the transition metal compound to (b) coordination sites which the ligand will occupy is from 0.1:1 to 100:1, preferably from 0.2:1 to 10:1, more preferably from 0.5:1 to 3:1, and most preferably from 0.8:1 to 2:1. However, as is also known in the art, it is possible for a solvent or for a monomer to act as a ligand. For the purposes of this application, a monomer is treated as being (a) distinct from and (b) not included within the scope of the ligand.

The present polymerisation may be conducted in the absence of solvent ("bulk" polymerisation). However, when a solvent is used, the reaction can be carried out as a suspension or a solution. Suitable solvents include water, ethers, cyclic ethers, $C_{5-10}$ alkanes, $C_{5-8}$ cycloalkanes which may be substituted with from 1 to 3 $C_{1-4}$ alkyl groups, aromatic hydrocarbon solvents, halogenated hydrocarbon solvents, acetonitrile, dimethylformamide, DMSO, DMAC, mixtures of such solvents, and supercritical solvents (such as $CO_2$, $C_{1-4}$ alkanes in which any H may be replaced with F, etc.). Aprotic polar solvents are especially preferred. The present polymerisation may also be conducted in accordance with known suspension, emulsion and precipitation polymerisation processes.

Suitable ethers include compounds of the formula $R^{31}OR^{32}$, in which each of $R^{31}$ and $R^{32}$ is independently an alkyl group of from 1 to 6 carbon atoms which may be further substituted with a $C_{1-4}$-alkoxy group. Preferably, when one of $R^{31}$ and $R^{32}$ is methyl, the other of $R^{31}$ and $R^{32}$ is alkyl of from 4 to 6 carbon atoms or $C_{1-4}$-alkoxyethyl. Examples include diethyl ether, ethyl propyl ether, dipropyl ether, methyl t-butyl ether, di-t-butyl ether, glyme (dimethoxyethane) diglyme (diethylene glycol dimethyl ether), etc.

Suitable cyclic ethers include THF and dioxane. Suitable aromatic hydrocarbon solvents include benzene, toluene, o-xylene, m-xylene, p-xylene and any isomer or mixture of isomers of cumene. Suitable halogenated hydrocarbon solvents include $CH_2Cl_2$, 1,2-dichloroethane and benzene substituted from 1 to 6 times with fluorine and/or chlorine, although one should ensure that the selected halogenated hydrocarbon solvent(s) does not act as an initiator under the reaction conditions.

Keys to controlling the polymerisation reaction may include (1) matching the reactivity of the groups in the initiator with the group(s) on the monomer ($R^{13}$–$R^{16}$), and (2) matching the energetics of bond breaking and bond forming in dormant species (eg, dormant polymer chains) and transition metal species (as discussed elsewhere in the specification). Matching the reactivities of the initiator with the monomer depends to some degree on the radical stabilizing effects of the substituents. Thus, where the monomer is a simple alkene or halogenated alkene (eg, ethylene, propylene, vinyl chloride, etc.), one may select an alkyl halide initiator. On the other hand, if one wishes to polymerise an arene- or ester-stabilised monomer (eg, a (meth)acrylate, acrylonitrile or styrene), one may select an initiator which is stabilised by a similar group (ie. it contains an aryl, heterocyclyl, alkoxycarbonyl, CN, carboxyamido group, etc.). Such "matching" of substituents on the initiator and monomer provides a beneficial balance of the relative reactivities of the initiator and monomer.

Preferably, the monomer, initiator, transition metal compound and ligand are selected such that the rate of initiation is not less than 1,000 times (preferably not less than 100 times) slower than the rate of propagation and/or transfer of the X group to the polymer radical. (In the present application, "propagation" refers to the reaction of a polymer radical with a monomer to form a polymer-monomer adduct radicals.)

The present polymerisation may be conducted in bulk, in the gas phase (eg, by passing the monomer in the gas phase over a bed of the catalyst which has been previously contacted with the initiator and ligand), in a sealed vessel or in an autoclave. Polymerising may be conducted at a temperature of from –78° to 200°, preferably from 0° to 160° and most preferably from 10° to 80°. The reaction should be conducted for a length of time sufficient to convert at least 10% (preferably at least 50%, more preferably at least 75% and most preferably at least 90%) of the monomer to polymer. Typically, the reaction time will be from several minutes to 5 days, preferably from 30 minutes to 3 days, and most preferably from 1 to 24 hours. Polymerising may be conducted at a pressure of from 0.1 to 100 atmospheres, preferably from 1 to 50 atmospheres and most preferably from 1 to 10 atmospheres (although the pressure may not be measurable directly if conducted in a sealed vessel).

One may also conduct a "reverse" ATRP, in which the transition metal compound is in its oxidised state, and the polymerisation is initiated by, for example, a radical initiator such as azobis(isobutyronitrile) ("AIBN"), a peroxide such as benzoyl peroxide (BPO) or a peroxy acid such as peroxyacetic acid or peroxybenzoic acid.

After the polymerising step is complete, the formed polymer is isolated. The isolating step of the present process is conducted by known procedures, and may comprise precipitating in a suitable solvent, filtering the precipitated polymer, washing the polymer and drying the polymer.

Precipitation can be typically conducted using a suitable $C_{5-8}$-alkane or $C_{5-8}$-cycloalkane solvent, such as pentane hexane, heptane, cyclohexane or mineral spirits, or using a $C_{1-6}$-alcohol, such as methanol, ethanol or isopropanol, or any mixture of suitable solvents. Preferably, the solvent for precipitating is hexane, mixtures of hexanes, or methanol.

The precipitated (co)polymer can be filtered by gravity or by vacuum filtration, in accordance with known methods (eg using a Buchner funnel and an aspirator). The polymer can then be washed with the solvent used to precipitate the polymer, if desired. The steps of precipitating, filtering and washing may be repeated, as desired.

Once isolated, the (co)polymer may be dried by drawing air through the (co)polymer, by vacuum, etc., in accordance with known methods (preferably by vacuum). The present (co)polymer may be analyzed and/or characterised by size exclusion chromatography, in accordance with known procedures.

The (co)polymers of the present invention may have a number average molecular weight of from 1000 to 500 000 g/mol, preferably of from 2000 to 250 000 g/mol, and more preferably of from 3000 to 200 000 g/mol. When produced in bulk, the number average molecular weight may be up to 1 000 000 (with the same minimum weights as mentioned above). The number average molecular weight may be determined by size exclusion chromatography (SEC) or, when the initiator has a group which can be easily distinguished from the monomer(s) by NMR spectroscopy Thus, the present invention also encompasses novel block, multi-block, star, gradient, random hyperbranched and dendritic copolymers, as well as graft or "comb" copolymers. Each of the these different types of copolymers will be described hereunder.

Because ATRP is a "living" polymerisation, it can be started and stopped, practically at will. Further, the polymer product retains the functional group "X" necessary to initiate a further polymerisation. Thus, in one embodiment, once the first monomer is consumed in the initial polymerising step, a second monomer can then be added to form a second block on the growing polymer chain in a second polymerising step. Additional polymerisations with the same or different monomer(s) can be performed to prepare multi-block copolymers.

Furthermore, since ATRP is a radical polymerisation, blocks can be prepared in essentially any order. One is not necessarily limited to preparing block copolymers where the sequential polymerising steps must flow from the least stabilised polymer intermediate to the most stabilised polymer intermediate, such as is necessary in ionic polymerisation. (However, as is described throughout the application, certain advantageous reaction design choices will become apparent. However, one is not limited to those advantageous reaction design choices in the present invention.) Thus, one can prepare a multi-block copolymer in which a polyacrylonitrile or a poly(meth)acrylate block is prepared first, then a styrene or butadiene block is attached thereto, etc.

Furthermore, a linking group is not necessary to join the different blocks of the present block copolymer. One can simply add successive monomers to form successive blocks. Further, it is also possible (and in some cases advantageous) to first isolate a (co)polymer produced by the present ATRP process, then react the polymer with an additional monomer using a different initiator/catalyst system (to "match" the reactivity of the growing polymer chain with the new monomer). In such a case, the product polymer acts as the new initiator for the further polymerisation of the additional monomer. Thus, the present invention also encompasses block copolymers. Preferably the number average molecular weight of each block is from 1000 to 250 000 g/mol.

The present invention is also useful for making essentially random copolymers. By "essentially random" copolymers, the copolymers are as close to statistically random as is possible under radical polymerisation conditions. The present ATRP process is particularly useful for producing random copolymers where one of the monomers has one or two bulky substituents (eg, 1,1-diarylethylene, didehydromalonate $C_{1-20}$ diesters, $C_{1-20}$ diesters of maleic or fumaric acid, maleic anhydride and/or maleic diimides from which homopolymers may be difficult to prepare, due to steric considerations. Preferably, the number average molecular weight of the copolymer is from 1000 to 1 000 000 g/mol. The ratio of (1) the total number of "blocks" of statistically random units to (2) the total number of monomer units is preferably at least 1:5, more preferably at least 1:8, and most preferably at least 1:10. The present random copolymer can also serve as a block in any of the present block copolymers.

Preferably, at least one of the monomers has the formula:

(V)

wherein at least one of $R^{13}$ and $R^{14}$ is CN, $CF_3$, straight or branched alkyl of from 4 to 20 carbon atoms (preferably from 4 to 10 carbon atoms, more preferably from 4 to 8 carbon atoms), $C_{3-8}$ cycloalkyl, aryl, heterocyclyl, C(=T)$R^{17}$, C(=T)$NR^{18}R^{19}$ and TC(=T)$R^{20}$, where aryl, heterocyclyl, T, $R^{17}$, $R^{18}$, $R^{19}$ and $R^{20}$ are as defined above; and $R^{15}$ and $R^{16}$ are as defined above; or $R^{13}$ and $R^{15}$ are joined to form a group of the formula C(=O)-T-C(=O), where T is as defined above.

More preferred monomers for the present (co)polymer include styrene, acrylonitrile, $C_{1-8}$ esters of (meth)acrylic acid and 1,1-diphenylethylene and derivatives thereof, especially sodium methacrylate, t-butylaminoethyl methacrylate, dimethylaminoethyl methacrylate, diethylaminoethyl methacrylate, dimethylaminopropyl methacrylamide, hydroxyethyl methacrylate, hydroxypropyl methacrylate, hydroxyethylmorpholine methacrylate, 2-methacryloxyethylglucoside, methoxypolyethyleneglycol methacrylate, glycerol monomethacrylate, 2-(sulphooxy)ethyl methacrylate ammonium salt, 3-sulphopropyl methacrylate potassium salt, [2-(methacryloxy)ethyl]dimethyl-(3-sulphopropyl)ammonium hydroxide inner salt, 4-vinyl benzoic acid and 4-styrenesulphonic acid sodium salt.

The present invention is also useful for forming so-called "star" polymers and copolymers.

In the present copolymers, each of the blocks may have a number average molecular weight in accordance with the homopolymers described above. Thus, the present copolymers may have a molecular weight which corresponds to the number of blocks (or in the case of star polymers, the number of branches times the number of blocks) times the number average molecular weight range for each block.

The present invention also encompasses graft or "comb" copolymers, prepared by sequential ATRPs. Thus, a (co)polymer is produced by a first ATRP, in which at least one of the monomers has a halogen substituent. Preferably, this substituent is Cl or Br. Examples of preferred monomers would thus include vinyl chloride, 1- or 2-chloropropene, vinyl bromide, 1,1- or 1,2-dichloro- or dibromoethene, trichloro- or tribromoethylene, tetrachloro- or tetrabromoethylene, chloroprene, 1-chlorobutadiene, 1- or 2-bromobutadiene, etc. More preferred monomers conclude vinyl chloride, vinyl bromide and chloroprene. It may be necessary to hydrogenate (by known methods) a (co)polymer produced in the first ATRP of chloroprene prior to the second ATRP, using the polymer produced by the first ATRP as the initiator.

Gradient or tapered copolymers can be produced using ATRP by controlling the proportion of two or more monomers being added. For example, one can prepare a first block or a oligomer) of a first monomer, then a mixture of the first monomer and a second, distinct monomer can be added in proportions of from, for example, 1:1 to 9:1 of first monomer to second monomer. After conversion of all monomer(s) is complete, sequential additions of first monomer-second monomers mixtures can provide subsequent "blocks" in which the proportions of first monomer to second monomer vary.

Preferably, the proportions of first and second monomers in subsequent "blocks" vary by at least 10%, preferably by at least 20%, up to 50%, from the preceding block. In a further embodiment, the relative proportions of first monomer to second monomer can be controlled in a continuous manner, using for example a programmable syringe or feedstock supply pump.

When either the initiator or monomer contains a substituent bearing a remote (ie unconjugated) ethylene or acetylene moiety, ATRP can be used to prepare cross-linked polymers and copolymers.

Polymers and copolymers produced by the present process have surprisingly low polydispersity for (co)polymers produced by radical polymerisation. Typically, the ratio of the weight average molecular weight to number average molecular weight "$M_w/M_n$") is $\leq 1.5$, preferably $\leq 1.4$, and can be as low as 1.10 or less.

Other Substituents

As well as the groups of formula

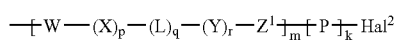

pendant groups of other types may optionally be present, ie groups which do not confer a benefit and/or which do not undergo a chemical change to enhance substrate affinity. Within that class of other groups is the sub-class of groups for enhancing the solubility of the material (eg groups which are, or contain one or more free carboxylic acid/salt and/or sulphonic acid/salt and/or sulphate groups).

Examples of solubility enhancing substituents include carboxyl, sulphonyl, hydroxyl, (poly)ethyleneoxy- and/or (poly)propyleneoxy-containing groups, as well as amine groups.

The other pendant groups preferably comprise from 0% to 65%, more preferably from 0% to 10% of the total number of pendant groups. The water-solubilising groups could comprise from 0% to 100% of those other groups but preferably from 0% to 20%, more preferably from 0% to 10%, still more preferably from 0% to 5% of the total number of other pendant groups.

The Macroinitiator

The macroinitiator which is formed as an intermediate step has a structure in which at least one sugar unit of the polysaccharide is substituted by a group of the general formula

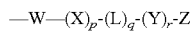

in which p, q, r, W, X, L and Y are as defined above and Z represents a control agent site from which a polymer may propagate during a free radical polymerisation process.

In one preferred embodiment, Z represents a group of formula

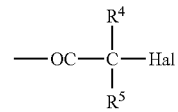

in which $R^4$ and $R^5$ are as defined above and Hal represents a halogen atom.

Hal may represent any halogen atom, that is, a fluorine, chlorine, bromine or iodine atom. However, it is preferred that Hal represents a chlorine or bromine, especially a bromine, atom.

In a particularly preferred embodiment, $R^4$ and $R^5$ both represent a methyl group and Hal represents a bromine atom.

In an alternative preferred embodiment, Z represents a group of formula

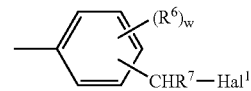

in which w, $R^6$ and $R^7$ are as defined above and $Hal^1$ represents a halogen atom.

$Hal^1$ may represent any halogen atom, that is, a fluorine, chlorine, bromine or iodine atom. However, it is preferred that Hal represents a chlorine or bromine, especially a bromine, atom.

In a particularly preferred embodiment, w is O, $R^7$ represents a hydrogen atom and $Hal^1$ represents a bromine atom.

Substituted polysaccharides in which W represents a group —O— or —NH—, p, q and r are 0 and Z represents a group —CO—C(CH$_3$)$_2$—Br are also preferred.

Another preferred group of substituted polysaccharides are those in which W represents a group —O— or —NH—, p and q are both 0, r is 1, Y represents a group —CH$_2$— or —CO— and Z represents a 4-(bromomethyl)phenyl group.

Synthesis of the Macroinitiator

The macroinitiators are prepared by a process which comprises reacting a polysaccharide with a compound of the general formula

in which p, q, r, X, L, Y and Z are as defined above and Q represents a leaving group. Preferably, Q is a halogen atom (F, Cl, Br, I) derived from an acid halide or an imidazole derived from the imidazolide, a urea derived from the O-acylisourea or an acid derived from the anhydride.

The reaction may be carried out as a suspension or solution in a polar solvent or mixture of polar solvents, such as water, alcohol, dimethylformamide (DMF), dimethyl sulphoxide (DMSO), N,N-dimethylacetamide (DMAC) etc. In one preferred embodiment, the polysaccharide is dissolved in an aprotic polar solvent, especially an anhydrous aprotic polar solvent, such as DMSO or DMAC. The reaction suitably takes place at a temperature in the range from 0 to 100° C., preferably 0 to 80° C., more preferably 0 to 65° C. Preferably, the reaction is carried out over a period of 12 to 24 hours, more preferably, 14 to 18 hours. It is also preferred that the reaction is carried out under an inert atmosphere, preferably a nitrogen atmosphere.

Compositions

The substituted polysaccharide according to the first aspect of the present invention may be incorporated into compositions containing only a diluent (which may comprise solid and/or liquid) and/or also comprising an active ingredient. The compound is typically included in said compositions at levels of from 0.01% to 25% by weight, preferably from 0.05% to 15%, more preferably from 0.1% to 10%, especially from 0.1% to 5% and most preferably from 0.5% to 3%.

The active ingredient in the compositions is preferably a surface active agent or a fabric conditioning agent. More than one active ingredient may be included. For some applications a mixture of active ingredients may be used.

The compositions of the invention may be in any physical form eg a solid such as a powder or granules, a tablet, a solid bar, a paste, gel or liquid, especially, an aqueous based liquid. In particular the compositions may be used in laundry compositions, especially in liquid, powder or tablet laundry composition.

The compositions of the present invention are preferably laundry compositions, especially main wash (fabric washing) compositions or rinse-added softening compositions. The main wash compositions may include a fabric softening agent and rinse-added fabric softening compositions may include surface-active compounds, particularly non-ionic surface-active compounds, if appropriate.

The detergent compositions of the invention may contain a surface-active compound (surfactant) which may be chosen from soap and non-soap anionic, cationic, non-ionic, amphoteric and zwitterionic surface-active compounds and mixtures thereof. Many suitable surface-active compounds are available and are fully described in the literature, for example, in "Surface-Active Agents and Detergents", Volumes I and II, by Schwartz, Perry and Berch.

The preferred detergent-active compounds that can be used are soaps and synthetic non-soap anionic and non-ionic compounds.

The compositions of the invention may contain linear alkylbenzene sulphonate, particularly linear alkylbenzene sulphonates having an alkyl chain length of $C_8$–$C_{15}$. It is preferred if the level of linear alkylbenzene sulphonate is from 0 wt % to 30 wt %, more preferably 1 wt % to 25 wt %, most preferably from 2 wt % to 15 wt %.

The compositions of the invention may contain other anionic surfactants in amounts additional to the percentages quoted above. Suitable anionic surfactants are well-known to those skilled in the art. Examples include primary and secondary alkyl sulphates, particularly $C_8$–$C_{15}$ primary alkyl sulphates; alkyl ether sulphates; olefin sulphonates; alkyl xylene sulphonates; dialkyl sulphosuccinates; and fatty acid ester sulphonates. Sodium salts are generally preferred.

The compositions of the invention may also contain non-ionic surfactant. Nonionic surfactants that may be used include the primary and secondary alcohol ethoxylates, especially the $C_8$–$C_{20}$ aliphatic alcohols ethoxylated with an average of from 1 to 20 moles of ethylene oxide per mole of alcohol, and more especially the $C_{10}$–$C_{15}$ primary and secondary aliphatic alcohols ethoxylated with an average of from 1 to 10 moles of ethylene oxide per mole of alcohol.

Non-ethoxylated nonionic surfactants include alkylpolyglycosides, glycerol monoethers, and polyhydroxyamides (glucamide).

It is preferred if the level of non-ionic surfactant is from 0 wt % to 30 wt %, preferably from 1 wt % to 25 wt %, most preferably from 2 wt % to 15 wt %.

Any conventional fabric conditioning agent may be used in the compositions of the present invention. The conditioning agents may be cationic or non-ionic. If the fabric conditioning compound is to be employed in a main wash detergent composition the compound will typically be non-ionic. For use in the rinse phase, typically they will be nonionic. They may for example be used in amounts from 0.5% to 35%, preferably from 1% to 30% more preferably from 3% to 25% by weight of the composition.

Suitable fabric conditioning agents are typically any of the free compounds corresponding to examples of the materials hereinbefore described as possible fabric conditioning benefit agent groups.

The compositions of the invention, when used as main wash fabric washing compositions, will generally also contain one or more detergency builders. The total amount of detergency builder in the compositions will typically range from 5 to 80 wt %, preferably from 10 to 60 wt %.

It is also possible to include certain mono-alkyl cationic surfactants which can be used in main-wash compositions for fabrics. Cationic surfactants that may be used include quaternary ammonium salts of the general formula $R_1R_2R_3R_4N^+$ $X^-$ wherein the R groups are long or short hydrocarbon chains, typically alkyl, hydroxyalkyl or ethoxylated alkyl groups, and X is a counter-ion (for example, compounds in which $R_1$ is a $C_8$–$C_{22}$ alkyl group, preferably a $C_8$–$C_{10}$ or $C_{12}$–$C_{14}$ alkyl group, $R_2$ is a methyl group, and $R_3$ and $R_4$, which may be the same or different, are methyl or hydroxyethyl groups); and cationic esters (for example, choline esters).

The choice of surface-active compound (surfactant), and the amount present, will depend on the intended use of the detergent composition. In fabric washing compositions, different surfactant systems may be chosen, as is well known to the skilled formulator, for handwashing products and for products intended for use in different types of washing machine.

The total amount of surfactant present will also depend on the intended end use and may be as high as 60 wt %, for example, in a composition for washing fabrics by hand. In compositions for machine washing of fabrics, an amount of from 5 to 40 wt % is generally appropriate. Typically the compositions will comprise at least 2 wt % surfactant, eg 2 to 60 wt %, preferably 15 to 40 wt %, most preferably 25 to 35 wt %.

Detergent compositions suitable for use in most automatic fabric washing machines generally contain anionic non-soap surfactant, or non-ionic surfactant, or combinations of the two in any suitable ratio, optionally together with soap.

The compositions of the invention, when used as main wash fabric washing compositions, will generally also contain one or more detergency builders. The total amount of detergency builder in the compositions will typically range from 5 to 80 wt %, preferably from 10 to 60 wt %.

Inorganic builders that may be present include sodium carbonate, if desired in combination with a crystallisation seed for calcium carbonate, as disclosed in GB 1 437 950 (Unilever); crystalline and amorphous aluminosilicates, for example, zeolites as disclosed in GB 1 473 201 (Henkel), amorphous aluminosilicates as disclosed in GB 1 473 202 (Henkel) and mixed crystalline/amorphous aluminosilicates as disclosed in GB 1 470 250 (Procter & Gamble); and layered silicates as disclosed in EP 164 514B (Hoechst). Inorganic phosphate builders, for example, sodium orthophosphate, pyrophosphate and tripolyphosphate are also suitable for use with this invention.

The compositions of the invention preferably contain an alkali metal, preferably sodium, aluminosilicate builder. Sodium aluminosilicates may generally be incorporated in amounts of from 10 to 70% by weight (anhydrous basis), preferably from 25 to 50 wt %.

The alkali metal aluminosilicate may be either crystalline or amorphous or mixtures thereof, having the general formula:

0.8–1.5 $Na_2O$. $Al_2O_3$. 0.8–6 $SiO_2$

These materials contain some bound water and are required to have a calcium ion exchange capacity of at least 50 mg CaO/g. The preferred sodium aluminosilicates contain 1.5–3.5 $SiO_2$ units (in the formula above). Both the amorphous and the crystalline materials can be prepared readily by reaction between sodium silicate and sodium aluminate, as amply described in the literature. Suitable crystalline sodium aluminosilicate ion-exchange detergency builders are described, for example, in GB 1 429 143 (Procter & Gamble). The preferred sodium aluminosilicates of this type are the well-known commercially available zeolites A and X, and mixtures thereof.

The zeolite may be the commercially available zeolite 4A now widely used in laundry detergent powders. However, according to a preferred embodiment of the invention, the zeolite builder incorporated in the compositions of the invention is maximum aluminium zeolite P (zeolite MAP) as described and claimed in EP 384 070A (Unilever). Zeolite MAP is defined as an alkali metal aluminosilicate of the zeolite P type having a silicon to aluminium ratio not exceeding 1.33, preferably within the range of from 0.90 to 1.33, and more preferably within the range of from 0.90 to 1.20.

Especially preferred is zeolite MAP having a silicon to aluminium ratio not exceeding 1.07, more preferably about 1.00. The calcium binding capacity of zeolite MAP is generally at least 150 mg CaO per g of anhydrous material.

Organic builders that may be present include polycarboxylate polymers such as polyacrylates, acrylic/maleic copolymers, and acrylic phosphinates; monomeric polycarboxylates such as citrates, gluconates, oxydisuccinates, glycerol mono-, di and trisuccinates, carboxymethyloxy succinates, carboxymethyloxymalonates, dipicolinates, hydroxyethyliminodiacetates, alkyl- and alkenylmalonates and succinates; and sulphonated fatty acid salts. This list is not intended to be exhaustive.

Especially preferred organic builders are citrates, suitably used in amounts of from 5 to 30 wt %, preferably from 10 to 25 wt %; and acrylic polymers, more especially acrylic/maleic copolymers, suitably used in amounts of from 0.5 to 15 wt %, preferably from 1 to 10 wt %.

Builders, both inorganic and organic, are preferably present in alkali metal salt, especially sodium salt, form.

Compositions according to the invention may also suitably contain a bleach system. Fabric washing compositions may desirably contain peroxy bleach compounds, for example, inorganic persalts or organic peroxyacids, capable of yielding hydrogen peroxide in aqueous solution.

Suitable peroxy bleach compounds include organic peroxides such as urea peroxide, and inorganic persalts such as the alkali metal perborates, percarbonates, perphosphates, persilicates and persulphates. Preferred inorganic persalts are sodium perborate monohydrate and tetrahydrate, and sodium percarbonate.

Especially preferred is sodium percarbonate having a protective coating against destabilisation by moisture. Sodium percarbonate having a protective coating comprising sodium metaborate and sodium silicate is disclosed in GB 2 123 044B (Kao).

The peroxy bleach compound is suitably present in an amount of from 0.1 to 35 wt %, preferably from 0.5 to 25 wt %. The peroxy bleach compound may be used in conjunction with a bleach activator (bleach precursor) to improve bleaching action at low wash temperatures. The bleach precursor is suitably present in an amount of from 0.1 to 8 wt %, preferably from 0.5 to 5 wt %.

Preferred bleach precursors are peroxycarboxylic acid precursors, more especially peracetic acid precursors and pernoanoic acid precursors. Especially preferred bleach precursors suitable for use in the present invention are N,N,N',N',-tetracetyl ethylenediamine (TAED) and sodium noanoyloxybenzene sulphonate (SNOBS). The novel quaternary ammonium and phosphonium bleach precursors disclosed in U.S. Pat. No. 4,751,015 and U.S. Pat. No. 4,818,426 (Lever Brothers Company) and EP 402 971A (Unilever), and the cationic bleach precursors disclosed in EP 284 292A and EP 303 520A (Kao) are also of interest.

The bleach system can be either supplemented with or replaced by a peroxyacid. examples of such peracids can be found in U.S. Pat. No. 4,686,063 and U.S. Pat. No. 5,397,501 (Unilever). A preferred example is the imido peroxycarboxylic class of peracids described in EP A 325 288, EP A 349 940, DE 382 3172 and EP 325 289. A particularly preferred example is phtalimido peroxy caproic acid (PAP). Such peracids are suitably present at 0.1 to 12 wt %, preferably 0.5 to 10 wt %.

A bleach stabiliser (transition metal sequestrant) may also be present. Suitable bleach stabilisers include ethylenediamine tetra-acetate (EDTA), the polyphosphonates such as Dequest (Trade Mark) and non-phosphate stabilisers such as EDDS (ethylenediamine disuccinate). These bleach stabilisers are also useful for stain removal especially in products containing low levels of bleaching species or no bleaching species.

An especially preferred bleach system comprises a peroxy bleach compound, preferably sodium percarbonate, optionally together with a bleach activator.

The compositions according to the invention may also contain one or more enzyme(s). Suitable enzymes include the proteases, amylases, cellulases, oxidases, peroxidases and lipases usable for incorporation in detergent compositions. Preferred proteolytic enzymes (proteases) are, catalytically active protein materials which degrade or alter protein types of stains when present as in fabric stains in a hydrolysis reaction. They may be of any suitable origin, such as vegetable, animal, bacterial or yeast origin.

Proteolytic enzymes or proteases of various qualities and origins and having activity in various pH ranges of from 4–12 are available and can be used in the instant invention. Examples of suitable proteolytic enzymes are the subtilins which are obtained from particular strains of *B. Subtilis B. licheniformis*, such as the commercially available subtilisins Maxatase (Trade Mark), as supplied by Gist Brocades N. V., Delft, Holland, and Alcalase (Trade Mark), as supplied by Novo Industri A/S, Copenhagen, Denmark.

Particularly suitable is a protease obtained from a strain of Bacillus having maximum activity throughout the pH range of 8–12, being commercially available, eg from Novo Industri A/S under the registered trade-names Esperase (Trade Mark) and Savinase (Trade-Mark). The preparation of these and analogous enzymes is described in GB 1 243 785. Other commercial proteases are Kazusase (Trade Mark obtainable from Showa-Denko of Japan), Optimase (Trade Mark from Miles Kali-Chemie, Hannover, West Germany), and Superase (Trade Mark obtainable from Pfizer of U.S.A.).

Detergency enzymes are commonly employed in granular form in amounts of from about 0.1 to about 3.0 wt %. However, any suitable physical form of enzyme may be used.

The compositions of the invention may contain alkali metal, preferably sodium carbonate, in order to increase detergency and ease processing. Sodium carbonate may suitably be present in amounts ranging from 1 to 60 wt %, preferably from 2 to 40 wt %. However, compositions containing little or no sodium carbonate are also within the scope of the invention.

Powder flow may be improved by the incorporation of a small amount of a powder structurant, for example, a fatty acid (or fatty acid soap), a sugar, an acrylate or acrylate/maleate copolymer, or sodium silicate. One preferred powder structurant is fatty acid soap, suitably present in an amount of from 1 to 5 wt %.

Other materials that may be present in detergent compositions of the invention include sodium silicate; antiredeposition agents such as cellulosic polymers; soil release polymers; inorganic salts such as sodium sulphate; lather control agents or lather boosters as appropriate; proteolytic and lipolytic enzymes; dyes; coloured speckles; perfumes; foam controllers; fluorescers and decoupling polymers. This list is not intended to be exhaustive. However, many of these ingredients will be better delivered as benefit agent groups in materials according to the first aspect of the invention.

The detergent composition when diluted in the wash liquor (during a typical wash cycle) will typically give a pH of the wash liquor from 7 to 10.5 for a main wash detergent.

Particulate detergent compositions are suitably prepared by spray-drying a slurry of compatible heat-insensitive ingredients, and then spraying on or post-dosing those ingredients unsuitable for processing via the slurry. The skilled detergent formulator will have no difficulty in deciding which ingredients should be included in the slurry and which should not.

Particulate detergent compositions of the invention preferably have a bulk density of at least 400 g/l, more preferably at least 500 g/l. Especially preferred compositions have bulk densities of at least 650 g/liter, more preferably at least 700 g/liter.

Such powders may be prepared either by post-tower densification of spray-dried powder, or by wholly non-tower methods such as dry mixing and granulation; in both cases a high-speed mixer/granulator may advantageously be used. Processes using high-speed mixer/granulators are disclosed, for example, in EP 340 013A, EP 367 339A, EP 390 251A and EP 420 317A (Unilever).

Liquid detergent compositions can be prepared by admixing the essential and optional ingredients thereof in any desired order to provide compositions containing components in the requisite concentrations. Liquid compositions according to the present invention can also be in compact form which means it will contain a lower level of water compared to a conventional liquid detergent.

Substrate

The substrate may be any substrate onto which it is desirable to deposit a graft polymer and which is subjected to treatment such as a washing or rinsing process.

In particular, the substrate may be a textile fabric, fabric, preferably of cotton.

It has been found that particular good results are achieved when using a natural fabric substrate such as cotton, or fabric blends containing cotton.

Treatment

The treatment of the substrate with the material of the invention can be made by any suitable method such as washing, soaking or rinsing of the substrate.

Typically the treatment will involve a washing or rinsing method such as treatment in the main wash or rinse cycle of a washing machine and involves contacting the substrate with an aqueous medium comprising the material of the invention.

EXAMPLES

The present invention will now be explained in more detail by reference to the following non-limiting examples:

Example 1

Preparation of Controlled Cellulose Monacetate (CMA)-Graft-Copolymers by Atom Transfer Radical Polymerisation (ATRP)

1(i) Preparation of CMA Based ATRP Macroinitiator

Method A: Under an atmosphere of nitrogen, 2-bromoisobutyryl bromide (5.98 g, 26 mmol) was added to a pre-cooled (0° C.) solution of 2-bromoisobutyric acid (4.34 g, 26 mmol) in a mixture of dry pyridine (5 mL) and N,N-dimethylacetamide (5 mL). Upon mixing, a yellow colour developed and precipitation was observed. The mixture was stirred for 10 minutes to allow complete formation of 2-bromoisobutyric anhydride) then added, in one lot, to a rapidly stirred solution of cellulose monoacetate (10.00 g, DS 0.7, 51.4 mmol anhydroglucose unit) in N,N-dimethylacetamide (50 mL) and 4-dimethylaminopyridine (0.10 g, 0.8 mmol). The resulting pale yellow solution was stirred for 16 hours overnight then the viscous reaction mixture was then poured very slowly into vigorously stirred methanol (600 mL) and the resulting precipitate filtered off (however, if this was too fine it was isolated by centrifugation). The solids were slurried in methanol (500 mL) and refiltered/centrifuged; this process being carried out two times. Following the second wash cycle the material was dried overnight in a vacuum oven at 40° C. This gave 5.53 g of the macroinitiator as a white powder.

$^1$H NMR (20% DCl in $D_2O$) $\delta_H$/ppm: 1.9 (0.22H, s, C[$CH_3$]$_2$); 2.1 (6.12H, s, $CH_3CO$); 3.1–3.9 (12H, m, glucose CH's and $CH_2$); 4.7 and 5.3 (2H, d, anomeric H's). Thus the NMR showed that the DS of the initiator group was 0.04.

Method B: Cellulose monacetate (10.00 g, DS 0.7, 51.4 mmol anhydroglucose unit) was dissoloved in N,N-dimethylacetamide (55 mL) by rapid stirring and heating to 80° C. This solution was allowed to cool to room temperature then dry pyridine (5 mL) was added. 2-Bromoisobutyryl bromide was added slowly to this stirred homogeneous mixture during 15 minutes whilst a blanket of nitrogen was maintained over the reaction flask. The cloudy mixture was stirred at room temperature for 18 hours overnight. The viscous reaction mixture was then poured very slowly into vigorously stirred methanol (600 ml) and the resulting precipitate filtered off (however, if this was too fine it was isolated by centrifugation. The solids were slurried in methanol (500 mL) and refiltered/centrifuged; this process being repeated two times. Following the second wash cycle the material was dried overnight in a vacuum oven at 40° C. This gave 6.86 g of the macroinitiator as a white powder. The NMR showed (as before) that the DS of the initiator group was 0.04.

1(ii) Preparation of CMA-graft-poly(styrene-4-sulphonic acid sodium salt). (see Scheme 2)

To a three-neck round bottomed flask equipped with a nitrogen inlet (via a closeable tap) was added a solution (heating was required to achieve full dissolution) of styrene 4-sulphonic acid sodium salt (2.062 g, 10.0 mmol) in N,N-dimethylacetamide (20 mL). A vigorous stream of nitrogen was passed through this solution in order to remove any dissolved oxygen. N-(n-Pentyl)-2-pyridylmethanimine (0.066 g, 0.4 mmol) and a solution of the CMA/bromoisobutyrate initiator ($DS_{initiator}$=0.04; 0.857 g, 2.3 mmol, so 0.2 mmol Br sites) in N,N-dimethylacetamide (5 mL) were added and the degassing continued. Copper(I)bromide (0.029 g, 0.2 mmol) was added and the mixture degassed for a further 10 minutes before being sealed under nitrogen. The brown coloured reaction mixture was stirred and heated to 80° C. for 16 hours, allowed to cool, then transferred to a single neck flask. The solvent was evaporated under reduced pressure and the solid residue dissolved in demineralised water (70 mL). The green coloured aqueous solution was filtered through a short column (45×35 mm, W×X) of silica gel (60H) so as to remove the copper. The pale yellow filtrate was frozen (using dry ice) then lyophilised to give 2.12 g of the grafted polysaccharide as a soft white flaky solid.

$^1$H NMR (D$_2$O), δ/ppm: 0.9–2.4 (bm, vinylic polymer backbone+acetyl CH$_3$ groups); 3.2–4.4 (bm, cellulosic CH's and CH$_2$'s); 6.2–7.1 (bm) and 7.3–7.9, (bm, aryl CH's).

Example 2

Preparation of Locust Bean Gum-graft-copolymers

2(i) Preparation of Locust Bean Gum Macroinitiator

A 9% w/v solution of lithiumn chloride (LiCl) in N,N-dimethylsulphoxide (DMSO) was prepared by heating 9 g of LiCl in 100 cm$^3$ of anhydrous DMSO of anhydrous DMSO to 150° C. in a 2-necked round bottom flask fitted with an overhead stirrer. Once a homgeneous solution had been obtained, Locust Bean Gum (LBG, MUD 246B ex Rhodia) (5 g, 0.031 mol of anhydromannose/galactose unit) was added to the solution gradually, maintaining the temperature at 150° C. until a highly viscous, clear, yellow solution had formed. This solution was then cooled to 65° C.

In a separate beaker, a solution of 2-bromoisobutyric acid (10.33 g, 0.062 mol) in anhydrous DMSO (50 cm$^3$) was prepared. To this solution, 1,1'-carbonyldiimidazole (CDI) (10 g, 0.00617 mol) was added slowly. Once the evolution of CO$_2$ had ceased, this solution was added to the LBG/DMSO/LiCl solution with stirring. The reaction mixture was maintained at 65° C. for 24 hours. It was then poured into a 3-fold volume of methanol, causing the product to precipitate. This was collected on a sinter funnel, then re-dispersed into methanol, filtered and washed with copious amounts of methanol. The product was dried under vacuo at 60° C. for 48 hours, yielding 3.5 g of a creamy, crystalline solid.

Characterisation:
IR: 1736 cm$^{-1}$ (s, saturated ester carbonyl) NMR ($^1$H-D$_2$O): 1.84 (d, ester CH$_3$, 6H); 3.4–4.6.6 (m, mannose/galactose CH and CH$_4$, 36H)

From the nmr, the degree of substitution (DS) of ester group per repeat unit of Locust Bean Gum is 0.83.

2(ii) Preparation of Locust Bean Gum-Graft-Poly(methacrylic acid)

To a 3-necked round bottom flask fitted with an N$_2$ inlet, thermometer and suba seal fitted with a syringe needle were added Locust Bean Gum-macroinitiator (1 g, 9.294×10$^{-4}$ mol), sodium methacrylate (5.02 g, 0.04647 mol) and a magnetic stirrer bar. The solids were dissolved in demineralised water (15 cm$^3$) and the resulting solution de-gassed by bubbling nitrogen gas through for 45 minutes. A mixture of copper (I) bromide (0.1333 g, 9.294×10$^{-4}$ mol) and 2,2'-dipyridyl (0.2937 g, 1.859×10$^{-3}$ mol) was added to the reaction flask. A polymerisation exotherm of 10° C. was noted. The reaction was stirred for 2 hours at ambient temperature. The contents of the flask was then diluted with demineralised water and the solution passed through a slurry of silica on a sinter funnel, yielding a water-white, clear solution. This was added to a 3-fold volume of methanol, causing the product to precipitate. This was collected on a filter and dried in vacuo at 40° C. to constant weight, yielding 2.8 g of white, crystalline powder.

Characterisation
IR: 1544 cm$^{-1}$ (vs, carboxylate ion) NMR ($^1$H-D$_2$O): 0.7–1.4 (m, CH$_3$ polymer main chain, 130H) 3.4–4.4 (m, mannose/galactose CH and CH$_2$, 36H).

This indicates that the number of repeat units (or degree of polymerisation, DP) of the grafted poly(methacrylic acid, Na salt) is 44.

Example 3

Clothes Care

3(i) Test Protocol
Linitester DTI Method
6 Linitester pots were filled with the following reagents and cloths:

|  | Pot 1 CMA | Pot 2–5 4 different polysaccharides | Pot 6 Control |
| --- | --- | --- | --- |
| Demineralised water | 160 mls | 160 mls | 160 mls |
| 10 g/l surfactant stock (LAS:A7/50:50 | 20 mls | 20 mls | 20 mls |
| 0.1M buffer stock | 20 mls | 20 mls | 20 mls |
| White Cotton Monitor (20 × 20 cm (5.77 g)) | ~5.77 g | ~5.77 g | ~5.77 g |
| Direct Red Cloth (1% dyed no fixer) (20 × 20 cm) | ~5.77 g | ~5.77 g | ~5.77 g |
| 0.4 g/l CMA | 0.08 g | N/A | N/A |
| 0.4 g/l experimental polysaccharides | N/A | 0.08 g | N/A |
| Total liquor volume | 200 mls | 200 mls | 200 mls |

Liquor to cloth ratio 17:1
The white cotton cloth was desized, mercerised, bleached, non-fluorescent cotton prepared via method 1.20 in Docfind. The direct red 80 was 1% dyed from stock.

The 0.1M buffer stock contained 0.08 M Na$_2$CO$_3$+0.02 M NaHCO$_3$. This gives pH≈10.5–10.0 at 0.01M in the final liquor. The surfactant stock contained 50:50 wt % LAS: Synperonic A7. The surfactant stock delivers 1 g/l total surfactant in the final liquor.

All the experiment's liquors were added to their respective containers except for the cloths and the polysaccharide samples. Next the cloths and the polysaccharides were added to their respective containers and the wash run for 30 minutes in the Linitester set at 40° C. and 40 rpm. After 30 minutes a sample of the liquor was removed from the containers and stored in glass vials. In total there was 6 pots (1 control, 1 with unmodified CMA for comparison and 4 modified polysaccharides). The cloths were then removed; rinsed in demin water twice and then line dried for 30 minutes.

This procedure was repeated 4 more times to give results over 5 washes. After 5 washes the cloths were ironed and then stored in the humidity controlled room at 20° C. and 65% humidity for 24 hours. This ensured a degree of control over the moisture within the samples.

For those materials marked with an asterisk, the polymer was only added at 0.04 g per wash and the data were those obtained after 1 wash.

Colour Analysis (Colour Fading & Dye Transfer Inhibition)

The reflectance spectrum of the cloths were measured after each wash cycle, using the ICS Texicon Spectraflash. Settings were UV excluded from 420 nm, Specular included, Large aperture, 4 cloth thickness. Readings were also taken from a non-treated piece of the same fabrics (Direct Red and white) to compare against. The reflectance spectra were used to calculate CIELAB)E and % colour strength values for the white and red cloths respectively.

Kawabata Suite Shear Hysteresis (Softness/Anti-Wrinkle)

Fabric was measured according to the standard instruction manual for this instrument. Testing was performed with the warp direction perpendicular to the motion of the clamping bars. The instrument outputted the measurements as average values of two replicates with the figures for 2HGS, (Hysteresis at 5° of shear). Those skilled in the art will know that the 2HG5 value is a good predictor of softness and anti-wrinkle properties of the fabric.

Crease Recovery Angle (CRA) (Anti-Wrinkle Benefit)

Measurements were performed using the "Shirley" Crease Recovery Angle apparatus (serial no. 1554803) with six replicates for each treatment according to BS:EN 22313: 1992. Fabric was tested only in the warp direction on pieces 5×2.5 cm. All pieces were handled using tweezers to ensure no contamination. Results are reported as the average of the measurements.

Residual Extension (Dimensional Stability)

The residual extension was determined using an Inströn Testometric (trade mark) tester:

| Sample size: | 150 mm × 50 mm |
| --- | --- |
| Clamp width: | 25 mm |
| Stretch area: | 100 mm × 25 mm |
| Elongation rate: | 100 mm/min |
| Extension cycle: | Begin at rest with 0 kg force |
| | Extend until 0.2 kg force is attained |
| | Return to 0 kg force |

3(ii) Experimental Results

Key

| | |
| --- | --- |
| + | significant benefit |
| − | significant negative |
| = | statistically indistinguishable |

Materials

*LBG-g-PDMAEMA=Locust bean gum with grafts of polydimethylaminoethylmethacrylate

*LBG-g-PSS=Locust bean gum with grafts of polystyrene sulphonate sodium salt

*LBG-g-PNaMA=Locust bean gum with grafts of poly methacrylate sodium salt

CMA-g-PPEGMA=cellulose monoacetate with grafts of poly (polyethyleneglycol-methacrylate)

Anti-Wrinkle Benefit

| | Crease | Performance compared to | |
| --- | --- | --- | --- |
| Treatment | recovery angle | no treatment | unmodified CMA |
| Control (1) | 63.8 | n/a | n/a |
| CMA (1) | 66.0 | + | n/a |
| LBG-g-PDMAEMA | 67.8 | + | = |
| LBG-g-PSS | 64.7 | = | = |
| LBG-g-PNaMA | 62.8 | = | − |
| Control (2) | 66.0 | n/a | n/a |
| CMA (2) | 68.8 | + | n/a |
| CMA-g-PPEGMA | 74.8 | + | + |

Colour Fading=Colour Analysis

| | | Performance compared to | |
| --- | --- | --- | --- |
| Treatment | % colour strength | no treatment | unmodified CMA |
| Control (1) | 92.1 | n/a | n/a |
| CMA (1) | 94.7 | = | n/a |
| LBG-g-PDMAEMA | 95.6 | = | = |
| LBG-g-PSS | 96.4 | = | = |
| LBG-g-PNaMA | 91.2 | = | = |
| Control (2) | 78.0 | n/a | n/a |
| CMA (2) | 80.1 | = | n/a |
| CMA-g-PPEGMA | 81.0 | = | = |

Dye Transfer Inhibition

| | | Performance compared to | |
| --- | --- | --- | --- |
| Treatment | Delta E | no treatment | unmodified CMA |
| Control (1) | 42.2 | n/a | n/a |
| CMA (1) | 37.5 | + | n/a |
| LBG-g-PDMAEMA | 40.5 | = | − |
| LBG-g-PSS | 41.6 | = | − |
| LBG-g-PNaMA | 41.8 | = | − |
| Control (2) | 45.6 | n/a | n/a |

-continued

| Treatment | Delta E | Performance compared to no treatment | unmodified CMA |
|---|---|---|---|
| CMA (2) | 35.2 | + | n/a |
| CMA-g-PPEGMA | 39.8 | □ | − |

Softness/Anti-Wrinkle

| Treatment | 2HG5 | Performance compared to no treatment | unmodified CMA |
|---|---|---|---|
| Control (1) | 7.18 | n/a | n/a |
| CMA (1) | 6.80 | = | n/a |
| LBG-g-PDMAEMA | 7.62 | = | = |
| LBG-g-PSS | 7.27 | = | = |
| LBG-g-PNaMA | 7.50 | − | = |
| Control (2) | 7.30 | n/a | n/a |
| CMA (2) | 7.39 | = | n/a |
| CMA-g-PPEGMA | 7.24 | = | = |

Example 4

Soil Release

4(i) Test Protocol
Conditions: tergotometer, 100 rpm, 23° C.
 PRE-WASH:—6 3"×3" desized cotton squares, in 1 liter of wash liquor
  (liquor: cloth ca. 200:1)—200 ppm grafted polysaccharide in wash liquor made up of 1 liter of demineralised water containing either
  a) buffered solution (20 cm$^3$) or
  b) buffered solution (20 cm$^3$) and surfactant solution (10 cm$^3$)
  Note: buffered solution: 30 g NaCl, 33 g Na tripolyphosphate and 37.5 g Na$_2$CO$_3$ in 1000 cm$^3$ demin water
  Surfactant solution: LAS stock solution (12.3 g 48% LAS paste in 100 cm$^3$ demin water)
  agitated for 20 mins
  wash liquor decanted off
 Rinse: 1 liter of demineralised water
  Agitated for 5 mins
  Liquor decanted off, cloths removed and placed on racks to dry
  NB: cloths NOT wrung.
  Before staining, cloths are reflected using GretagMacbeth Coloreye
 STAINING: 2 stains used,
  1. dirty motor oil (DMO) diluted to 15 wt. % in toluene
  2. clay (a 50 wt. % dispersion in water)
  DMO is applied in-house
  Clay is prepared and applied by Equest, Co. Durham, UK.
  4 drops of diluted DMO applied from a burette to each 3"×3" square
  Left to dry on racks in the dark overnight
  After staining, cloths are reflected using GretagMacbeth Coloreye MAIN WASH & rinse: as pre-wash, but using only b) as wash liquor
 After washing, cloths are reflected using GretagMacbeth Coloreye.
 ANALYSIS: results are obtained by extracting R460 values of the cloths
  1. before staining ($R_{clean}$)
  2. after staining ($R_{stain}$)
  3. after final washing ($R_{washed}$)
  delta (Δ) R is calculated for all samples including control (no polymer treatment):

$R_{washed} - R_{stain}$

ΔΔR is then calculated for quick comparison to the control $\Delta R_{polymer} - \Delta R_{control}$ 4(ii) Experimental Results

| Stain | Prewash condition | Polymer | ΔΔΔR (polymer-control) |
|---|---|---|---|
| DMO | LAS + Buffer | control | 0.0 |
|  |  | LBG(15)-DMAEMA(43) | 5.6 |
|  | Buffer | control | 0.0 |
|  |  | LBG(15)-PEGMA(10) | 3.2 |
|  |  | LBG(15)-DMAEMA(43) | 4.6 |
|  |  | LBG(15)-Na MA(28) | 2.5 |
| CLAY | LAS + Buffer | Control | 0.0 |
|  |  | LBG(15)-SSA(70) | 1.3 |
|  |  | LBG(15)-Na MA(28) | 0.5 |
|  | Buffer | Control | 0.0 |
|  |  | LBG(15)-SSA(70) | 3.9 |
|  |  | LBG(15)-Na MA(28) | 1.8 |
| DMO | LAS + Buffer | control | 0.0 |
|  |  | XG(12)-SSA(31) | 1.5 |
|  | Buffer | control | 0.0 |
|  |  | XG(12)-SSA(31) | 1.1 |
| Clay | LAS + Buffer | control | 0.0 |
|  |  | XG(12)-HEMA(7). | 2.3 |
|  |  | XG(12)-SEM(14) | 1.5 |
|  |  | XG(12)-PEGMA(15) | 1.8 |
|  |  | XG(12)-NaMA(14)-co-PDMS(0.03) | 2.1 |

Key to Abbreviations
 For the polysaccharides:
LBG=Locust bean gum; the number in brackets refers to the DS of the graft is 1 in every 15 sugar rings
XG=Xyloglucan; the number in brackets refers to the DS of the graft is 1 in every 12 sugar rings
 For the graft co-polymers
DMAEMA=2-(dimethylamino)ethyl methacrylate
PEGMA=methoxypolyethyleneglycol methacrylate, Mw=430
Na Ma=methacrylic acid, sodium salt
SSA=styrene sulphonic acid, sodium salt
HEMA=2-hydroxyethyl methacrylate
SEM=2-(sulphooxy)ethyl methacrylate, ammonium salt
Na Ma-co-PDMS=co-polymer of methacrylic acid and monomethacryloxypropyl terminated polydimethylsiloxane (Mn=1000)

Note: the Number in Brackets Refers to the DP of the Graft Co-polymer as Determined by $^1$H-NMR.

The invention claimed is:

1. A laundry cleaning composition comprising a graft polymer benefit agent and at least one additional laundry cleaning ingredient, the graft polymer benefit agent having the general formula

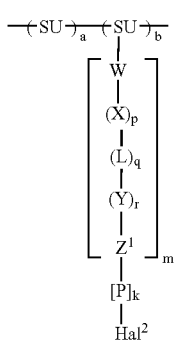

(IV)

in which each SU represents a sugar unit in a polysaccharide backbone;
- a represents the number of unsubstituted sugar units as a percentage of the total number of sugar units and is in the range from 0 to 99.9;
- b represents the number of substituted sugar units as a percentage of the total number of sugar units and is in the range from 0.1 to 100;
- m represents the degree of substitution per sugar unit and is from 1 to 3;
- W represents a group —O— or —NR$^1$—, where R$^1$ represents a hydrogen atom or an optionally substituted alkyl group;
- p, q and r are each independently 0 or 1;
- L represents an optionally substituted alkylene, cycloalkylene, arylene or heteroarylene group;
- X and Y each independently represent a group —CH$_2$—, —CO—, —O—CO—, —CO—O—, —NH—CO—, —CO—NH—, —CH(OH)—CH$_2$—, —CH$_2$—CH(OH)—, —CH$_2$—O—CO—, —CO—O—CH$_2$—, —CH$_2$CO—O—, —O—CO—CH$_2$—, —O—CO—NH—, —NH—CO—O—, —(CR$^2$R$^3$)$_s$—CO—, —CO—(CR$^2$R$^3$)$_s$—, —(CR$^2$R$^3$)$_t$—O—, —O—(CR$^2$R$^3$)$_t$—, —(CR$^2$R$^3$)$_u$—SO—, —SO—(CR$^2$R$^3$)$_u$—, —(CR$^2$R$^3$)$_{v-SO2}$—, —SO$_2$—(CR$^2$R$^3$)$_v$— or —NH—CO—NH, where s, t, u and v are each independently 0, 1, 2 or 3 and R$^2$ and R$^3$ each independently represent a hydrogen atom or an optionally substituted alkyl;
- Z$^1$ represents a group

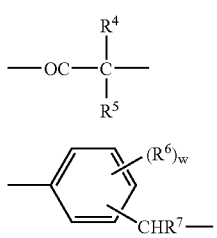

(VI)

or (VII)

R$^4$ and R$^5$ each independently represent an optionally substituted alkyl, cycloalkyl or aralkyl group, R$^6$ represents a hydrogen atom or an optionally substituted alkyl group, w is 0, 1, 2, 3, or 4; and R$^7$ represents a hydrogen atom or an optionally substituted alkyl group;

P represents a polymer chain, Hal$^2$ represents a halogen, and k is from 10 to 200.

2. A composition according to claim 1 in which W represents a group —O— or —NH—.

3. A composition according to claim 1, in which q is I and L is a —CH$_2$— group.

4. A composition according to claim 1, in which p and/or r is I and X and/or Y represents a group —CH$_2$—, —CO—, —CO—NH— or —NH—CO—.

5. A composition according to claim 1, in which Z$^1$ represents a group (VI) and R$^4$ and R$^5$ both represent a methyl group.

6. A composition according to claim 1, in which Z$^1$ represents a group (VII), w is 0 and R$^7$ represents a hydrogen atom.

7. A composition according to claim 1, in which W represents a group —O— or —NH—, p, q and r are 0 and Z$^1$ represents a group —CO—C(CH$_3$)$_2$—.

8. A composition according to claim 1, in which W represents a group —O— or —NH—, p and q are both 0, r is 1, Y represents a group —CH$_2$— or —CO— and Z$^1$ represents a 4-(methylene)phenyl group.

9. A composition according to claim 1, in which the polysaccharide backbone is β-1,4-linked.

10. A composition according to claim 1, in which the polysaccharide backbone is selected from the group consisting of cellulose, cellulose derivatives, xyloglucans, galactomannans, chitosan and chitosan salts.

11. A composition according to claim 1, in which the graft polymer has the general formula

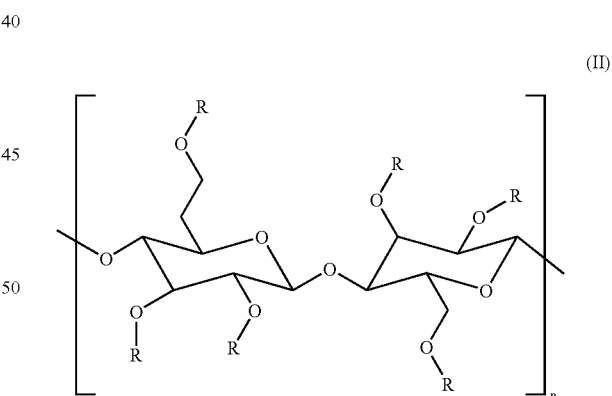

(II)

wherein at least one or more —OR groups of the polymer are independently replaced by a group

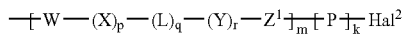

in which k, m, p, q, r, W, X, L, Y, Z$^1$, P and Hal$^2$ are as defined in any one of the preceding claims, and at least one or more R groups are independently selected from hydrogen atoms and groups of formulae:

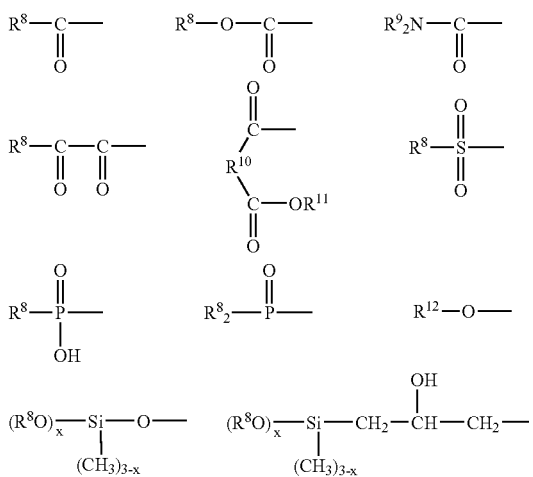

wherein each $R^8$ is independently selected from $C_{1-20}$ alkyl, $C_{2-20}$ alkenyl and $C_{5-7}$ aryl any of which is optionally substituted by one or more substituents independently selected from $C_{1-4}$ alkyl, $C_{1-12}$ alkoxy, hydroxyl, vinyl and phenyl groups;

each $R^9$ is independently selected from hydrogen and groups $R^8$ as hereinbefore defined;

$R^{10}$ is a bond or is selected from $C_{1-4}$ alkylene $C_{2-4}$ alkenylene and $C_{5-7}$ arylene groups, the carbon atoms in any of these being optionally substituted by one or more substituents independently selected from $C_{1-12}$ alkoxy, vinyl, hydroxyl, halo and amine groups;

each $R^{11}$ is independently selected from hydrogen, counter cations such as alkali metal or ½Ca or ½Mg, and groups $R^8$ as hereinbefore defined;

$R^{12}$ is selected from $C_{1-20}$ alkyl, $C_{2-20}$ alkenyl and $C_{5-7}$ aryl, any of which is optionally substituted by one or more substituents independently selected from $C_{1-4}$ alkyl, $C_{1-12}$ alkoxy, hydroxyl, carboxyl, cyano, sulphonato, vinyl and phenyl groups;

x is from 1 to 3; and groups R which together with the oxygen atom forming the linkage to the respective saccharide ring forms an ester or hemi-ester group of a tricarboxylic—or higher polycarboxylic—or other complex acid such as citric acid, an amino acid, a synthetic amino acid analogue or a protein;

any remaining R groups being selected from hydrogen and ether substituents.

12. A composition according to claim 1, in which m is from 1 to 2.

13. A composition according to claim 1, in which P represents a single polymer chain, a random copolymer of two or more monomers or a gradient block copolymer of two or more monomers.

14. A composition according to claim 1, in which the polysaccharide backbone has a number average molecular weight from 10 000 to 1 000 000.

15. A composition according to claim 1, in which the polymer is water soluble at a concentration of at least 0.2 mg/ml.

16. A composition according to claim 1, in which the grafts have a number average molecular weight of from 1000 to 200 000.

17. A composition according to claim 1, in which P represents a polymer chain derived from a free radically polymerisable alkene monomer.

18. A composition according to claim 1, in which P represents a polymer chain derived from a free radically polymerisable monomer selected from the group consisting of compounds of the general formula $$\begin{array}{c} R^{13} \\ \phantom{xx} \end{array} C = C \begin{array}{c} R^{15} \\ \phantom{xx} \end{array} \qquad (v)$$
$$\phantom{xxxx} R^{14} \phantom{xxxxxxxxxx} R^{16}$$

wherein $R^{13}$ and $R^{14}$ are independently selected from the group consisting of H, halogen, CN, $CF_3$, straight or branched $C_{1-20}$ alkyl, α, β-unsaturated straight or branched $C_{2-10}$ alkenyl or alkynyl, α, β-unsaturated straight or branched $C_{2-6}$ alkenyl substituted with a halogen, $C_3$–$C_8$ cycloalkyl, heterocyclyl, $C(=T)R^{17}$, $C(=T)NR^{18}R^{19}$ and $TC(=T)R^{20}$, where T may be $NR^{20}$ or O, $R^{17}$ is $C_{1-20}$ alkyl, $C_{1-20}$ alkoxy, aryloxy or heterocyclyloxy, $R^{18}$ and $R^{19}$ are independently H or $C_{1-20}$ alkyl or $R^{18}$ and $R^{19}$ may be joined together to form a $C_{2-5}$ alkylene group, thus forming a 3- to 6-membered ring, and $R^{20}$ is H, straight or branched $C_1$–$C_{20}$ alkyl or aryl; and $R^{15}$ and $R^{16}$ are independently selected from the group consisting of H, halogen $C_1$–$C_6$ alkyl, $COOR^{21}$ and $CONHR^{21}$ (where $R^{21}$ is H, an alkali metal, or a $C_1$–$C_6$ alkyl group optionally substituted by a hydroxy, amino, $C_{1-6}$ alkyl amino or di-($C_{1-6}$alkyl)amino group); or a heterocyclyl group optionally substituted by a $C_{1-6}$ alkyl or hydroxy $C_{1-6}$ alkyl group;

$R^{13}$ and $R^{15}$ may be joined to form a group of the formula $(CH_2)_{n'}$, (which may be substituted with from 1 to 2n' halogen atoms or $C_1$–$C_4$ alkyl groups) or $C(=O)$-T-C $(=O)$, where n' is from 2 to 6 and T is as defined above; and at least two of $R^{13}$, $R^{14}$, $R^{15}$ and $R^{16}$ are H or halogen.

19. A composition according to claim 1, in which P represents a polymer chain derived from a monomer selected from the group consisting of sodium methacrylate, t-butylaminoethyl methacrylate, dimethylaminoethyl methacrylate, diethylaminoethyl methacrylate, dimethylaminopropyl methacrylamide, hydroxyethyl methacrylate, hydroxypropyl methacrylate, hydroxyethylmorpholine methacrylate, 2-methacryloxyethyl glucoside, methoxypolyethyleneglycol methacrylate, glycerol monomethacrylate, 2-(sulphooxy)ethyl methacrylate ammonium salt, 3-sulphopropyl methacrylate potassium salt, [2-(methacryloxy)ethyl]dimethyl-(3-sulphopropyl)ammonium hydroxide inner salt, 4-vinyl benzoic acid and 4-styrenesulphonic acid sodium salt.

20. A composition according to claim 1, in which P represents a polymer chain which is a copolymer derived from a monomer selected from the group consisting of alkyl methacrylates, perfluoroalkyl methacrylates, and siloxane methacrylates.

21. A composition according to claim 1, comprising from 0.01% to 25%, of the graft polymer by weight of the total composition.

22. A composition according to claim 1, wherein the at least one additional ingredient is selected from surfactants, detergency builders, bleaches, transition metal sequestrants, enzymes, fabric softening and/or conditioning agents, lubricants for inhibition of fibre damage and/or for colour care and/or for crease reduction and/or for ease of ironing, UV absorbers such as fluorescers and photofading inhibitors, for example sunscreens/UV inhibitors and/or anti-oxidants, fungicides, insect repellents and/or insecticides, perfumes, dye fixatives, waterproofing agents, deposition aids, flocculants, anti-redeposition agents and soil release agents.

23. A method of delivering one or more laundry benefits in the cleaning of a textile fabric, the method comprising contacting the fabric with the composition as defined in claim 1.

24. The composition of claim 1 wherein a is in the range from 65 to 99%.

25. The composition of claim 1 wherein a is in the range from 80 to 99%.

26. The composition of claim 1 wherein b is in the range from 1 to 35%.

27. The composition of claim 1 wherein b is in the range from 1 to 20%.

28. The method of claim 23 wherein the composition is in the form of an aqueous dispersion of solution.

* * * * *